US012583948B2

(12) United States Patent
Arndt et al.

(10) Patent No.: US 12,583,948 B2
(45) Date of Patent: Mar. 24, 2026

(54) PHOTOHARDENABLE COMPOSITIONS, METHODS, AND A STABILIZER

(71) Applicant: Quadratic 3D, Inc., Charlestown, MA (US)

(72) Inventors: Emily M. Arndt, Akron, OH (US); Samuel N. Sanders, Arlington, MA (US)

(73) Assignee: QUADRATIC 3D, INC., Charlestown, MA (US)

( * ) Notice: Subject to any disclaimer, the term of this patent is extended or adjusted under 35 U.S.C. 154(b) by 84 days.

(21) Appl. No.: 18/374,294

(22) Filed: Sep. 28, 2023

(65) Prior Publication Data

US 2024/0018277 A1 Jan. 18, 2024

Related U.S. Application Data

(63) Continuation of application No. PCT/US2022/022617, filed on Mar. 30, 2022.

(60) Provisional application No. 63/169,168, filed on Mar. 31, 2021.

(51) Int. Cl.
*B33Y 70/00* (2020.01)
*B29C 64/129* (2017.01)
*B33Y 10/00* (2015.01)
*C08F 2/50* (2006.01)
*C08G 73/02* (2006.01)
*B29K 79/00* (2006.01)
*B29K 105/00* (2006.01)

(52) U.S. Cl.
CPC .............. *C08F 2/50* (2013.01); *B29C 64/129* (2017.08); *B33Y 10/00* (2014.12); *B33Y 70/00* (2014.12); *C08G 73/024* (2013.01); *B29K 2079/00* (2013.01); *B29K 2105/0044* (2013.01)

(58) Field of Classification Search
None
See application file for complete search history.

(56) References Cited

U.S. PATENT DOCUMENTS 3,018,262 A 1/1962 Schroeder
3,117,099 A 1/1964 Proops et al.
3,218,305 A * 11/1965 Krieble ...................... C09J 4/00 526/89
4,041,476 A 8/1977 Swainson
4,078,229 A 3/1978 Swainson et al.
4,238,840 A 12/1980 Swainson
4,279,717 A 7/1981 Eckberg et al.
4,333,165 A 6/1982 Swainson et al.
4,466,080 A 8/1984 Swainson et al.
4,471,470 A 9/1984 Swainson et al.
4,575,330 A 3/1986 Hull
4,642,126 A 2/1987 Zador et al.
4,652,274 A 3/1987 Boettcher et al.
5,014,468 A 5/1991 Ravipati et al.
5,235,015 A 8/1993 Ali et al.
5,412,047 A 5/1995 Georges et al.
5,545,676 A 8/1996 Palazzotto et al.
5,728,747 A * 3/1998 Kazmaier ............. C08F 293/00 522/182
5,753,346 A 5/1998 Leir et al.
5,856,373 A 1/1999 Kaisaki et al.
5,998,495 A 12/1999 Oxman et al.
6,025,406 A 2/2000 Oxman et al.
6,068,688 A 5/2000 Whitehouse et al.
6,472,485 B2 10/2002 Macleod et al.
6,548,593 B2 4/2003 Merz et al.
7,005,229 B2 2/2006 Nirmal et al.
9,376,602 B2 6/2016 Walther et al.
9,795,541 B2 10/2017 Fontein et al.
10,245,785 B2 4/2019 Adzima
10,843,410 B2 11/2020 Lippert et al.
2002/0002213 A1 1/2002 Walz et al.
2005/0143546 A1 6/2005 Jaszewski et al.
2014/0339532 A1* 11/2014 Benson-Smith ..... H10K 85/111 257/40
2017/0043580 A1 2/2017 Takagi et al.
2018/0317307 A1 11/2018 Bourke, Jr. et al.
2020/0199346 A1* 6/2020 Rist ......................... C08L 33/08
(Continued)

FOREIGN PATENT DOCUMENTS

EP 1 563 821 A1 8/2005
JP 2021 024 970 A * 2/2021
WO WO 2019/025717 2/2019
(Continued)

OTHER PUBLICATIONS

Aldrich Material Science, "Controlled Radical Polymerization Guide ATRP/RAFT/NMP", Sigma-Aldrich Co, LLC 2012.
(Continued)

*Primary Examiner* — Mohammad M Ameen

(57) ABSTRACT

A stabilizer for inclusion in a photohardenable composition comprising a hardenable resin component and a photoinitiator, the stabilizer comprising a stable free radical functionalized polymer, wherein the stabilizer is dispersible or dissolvable in the hardenable resin component. A photohardenable composition including a hardenable resin component, a photoinitiator, and a stabilizer comprising a stable free radical functionalized polymer and methods including a photohardenable composition and products of the methods are also disclosed. A photohardenable composition can further include an upconverting component.

21 Claims, No Drawings

(56) References Cited

U.S. PATENT DOCUMENTS

| | | | |
|---|---|---|---|
| 2020/0361152 | A1 | 11/2020 | Shusteff et al. |
| 2023/0339177 | A1 | 10/2023 | Korevaar |

FOREIGN PATENT DOCUMENTS

| | | | |
|---|---|---|---|
| WO | WO 2019/164808 | A1 | 8/2019 |
| WO | WO 2020/017615 | A1 | 1/2020 |
| WO | WO 2020/113018 | A1 | 6/2020 |
| WO | WO 2020/257231 | A1 | 12/2020 |
| WO | WO 2021/067577 | A1 | 4/2021 |
| WO | WO 2021/154895 | A1 | 8/2021 |
| WO | WO 2021/154897 | A1 | 8/2021 |
| WO | WO 2021/202524 | A1 | 10/2021 |
| WO | WO 2021/247926 | A1 | 12/2021 |
| WO | WO 2021/247930 | A1 | 12/2021 |
| WO | WO 2023/073034 | A1 | 5/2023 |

OTHER PUBLICATIONS

Cook, Caitlyn C., et al., "Highly Tunable Thiol-ene Photoresins for Volumetric Additive Manufacturing", Advanced Materials, vol. 32, Issue 47 (Oct. 1, 2020).

Cook, Caitlyn C., et al., "Highly Tunable Thiol-ene Photoresins for Volumetric Additive Manufacturing", Advanced Materials, vol. 32, Issue 47—Supporting Information 2020.

Eibel, Anna, et al., "Choosing the ideal photoinitiator for free radical polymerizations: predictions based on simulations using established data", Polym. Chem., 2018, 9, 5107.

Haruki, Rena, et al, Chem. Commun., 2020, "Leaping across the visible range:-infrared-to-violet photon upconversion employing a silyl-substituted anthracene", Advance Article accepted May 13, 2020 and published May 13, 2020.

International Search Report, Written Opinion, and PCT Search History mailed Aug. 11, 2022 in International Application No. PCT/US2022/022617 of Quadratic 3D, Inc. Filed Mar. 20, 2022 (parent of the present application).

Lee, Yi-Hsiung, et al., "Fabrication of Periodic 3D Nanostructuration for Optical Surfaces by Holographic Two-Photon-Polymerization", Int'l Journal of Information and Electronics Engineering, vol. 6, No. 3, May 2016.

Liu, Shaojie, et al., "Preparation of Nitroxide Polymer Brushes and Their Applications in the Synthesis of an Epoxidized Soybean Oil Acrylate as an Inhibitor", Ind. Eng. Chem. Res., 2015, 54, 5475-5480.

Liu, Shaojie, et al., "TEMPO Functionalized Polymers: Synthesis and Applications", Current Organic Chemistry, 2016, 1389-1403.

Sanders, Samuel N., et al., "Photon Upconversion in Aqueous Nanodroplets", J. Amer. Chem. Soc. 2019, 141, 9180-9184.

Sigma-Aldrich, TEMPO methacrylate, Product 730297, product sheet, 2021 Merck KGaA, Darmstard, Germany.

Sigma-Aldrich, TEMPO, polymer, Product 566098, product sheet, 2021 Merck KGaA, Darmstard, Germany.

Texas Instruments "DLP6500 0.65 1018p MVSP Type A DMD", DLP6500, DLPS040A—Oct. 2014—Revised Oct. 2016.

Texas Instruments "TI DL® Technology for 3D Printing—Design scalable high-speed stereolithography [sic] systems using TI DLP technology" 2016.

Texas Instruments Application Report DLPA022—Jul. 2010 entitled "DLPTM System Optics" Jul. 2010.

* cited by examiner

PHOTOHARDENABLE COMPOSITIONS, METHODS, AND A STABILIZER

CROSS-REFERENCE TO RELATED APPLICATIONS

This application is a continuation of International Application No. PCT/US2022/022617 filed Mar. 30, 2022, which International Application claims priority to U.S. Provisional Patent Application No. 63/169,168, filed on Mar. 31, 2021, which applications are hereby incorporated herein by reference in their entireties for all purposes.

TECHNICAL FIELD OF THE INVENTION

The present invention relates to the technical field of light-activated polymerization and related compositions, materials, methods, products, and uses thereof.

BRIEF SUMMARY OF THE INVENTION

The present invention includes photohardenable compositions, methods for forming an article, and methods for spatially limiting photohardening of a photohardenable composition during formation of an article, and products of the foregoing. Preferred photohardenable compositions and methods include a hardenable resin component, a photoinitiator, and a stabilizer comprising a stable free radical-functionalized polymer. The present invention also includes a stabilizer comprising a stable free radical-functionalized polymer for inclusion in a photohardenable composition, the use of a stabilizer comprising a stable-free radical functionalized polymer in photohardenable compositions, and the use of a stabilizer comprising a stable-free radical functionalized polymer in methods including a photohardenable composition for forming an article. The photohardenable compositions and methods can optionally further include an upconverting component.

In accordance with one aspect of the present invention, there is provided a photohardenable composition comprising: (i) a hardenable resin component; (ii) a photoinitiator configured to create reactive species for initiating hardening of the photohardenable composition when activated by radiation; and (iii) a stabilizer comprising a stable free radical-functionalized polymer.

In accordance with another aspect of the present invention, there is provided a photohardenable composition comprising: (i) a hardenable resin component; (ii) a photoinitiator configured to create reactive species for initiating hardening of the photohardenable composition when activated by radiation; (iii) an upconverting component configured to upconvert excitation light at one or more wavelengths in a first range of wavelengths to upconverted light including one or more wavelengths in a second range of wavelengths, wherein the upconverted light includes radiation at one or more wavelengths for activating the photoinitiator; and (iv) a stabilizer comprising a stable free radical-functionalized polymer.

In accordance with still another aspect of the invention, there is provided a method of forming an article, the method comprising: (a) providing a photohardenable composition comprising (i) a hardenable resin component; (ii) a photoinitiator configured to create reactive species for initiating hardening of the photohardenable composition when activated by radiation; and (iii) a stabilizer comprising a stable free radical-functionalized polymer; (b) irradiating one or more selected locations in the photohardenable composition with radiation including one or more wavelengths for activating the photoinitiator to initiate hardening of the photohardenable composition at the one or more selected locations within the photohardenable composition; and (c) optionally repeating step (b) at one or more of the same or different selected locations within the photohardenable composition until at least a portion of the article is formed.

In accordance with yet another aspect of the invention, there is provided a method of forming an article, the method comprising: (a) providing a volume of a photohardenable composition comprising (i) a hardenable resin component; (ii) a photoinitiator configured to create reactive species for initiating hardening of the photohardenable composition when activated by radiation; (iii) an upconverting component configured to upconvert excitation light at one or more wavelengths in a first range of wavelengths to upconverted light including one or more wavelengths in a second range of wavelengths, wherein the upconverted light includes radiation including one more wavelengths for activating the photoinitiator; and (iv) a stabilizer comprising a stable free radical-functionalized polymer; (b) irradiating one or more locations in the photohardenable composition with excitation light at one or more wavelengths in the first range of wavelengths for upconversion by the upconverting component and initiating local hardening of the photohardenable composition at the one or more locations in the photohardenable composition; and (c) optionally repeating step (b) at one or more of the same or a different selected locations within the volume of the photohardenable composition until at least a portion of the article is formed.

In accordance with yet another aspect of the invention, there is provided a method of forming an article, the method comprising: (a) providing a volume of a photohardenable composition comprising (i) a hardenable resin component; (ii) a photoinitiator configured to create reactive species for initiating hardening of the photohardenable composition when activated by radiation; (iii) an upconverting component configured to upconvert excitation light at one or more wavelengths in a first range of wavelengths to upconverted light including one or more wavelengths in a second range of wavelengths, wherein the upconverted light includes radiation including one more wavelengths for activating the photoinitiator; and (iv) a stabilizer comprising a stable free radical-functionalized polymer; (b) directing excitation light at one or more wavelengths in the first range of wavelengths into the volume of the photohardenable composition for upconversion by the upconverting component and initiating local hardening of the photohardenable composition at one or more selected locations within the volume of the photohardenable composition; and (c) optionally repeating step (b) at one or more of the same or a different selected locations within the volume of the photohardenable composition until at least a portion of the article is formed.

In accordance with still another aspect of the invention, there is provided a method for spatially limiting photohardening of a photohardenable composition during formation of an article, the method comprising (a) providing a photohardenable composition comprising (i) a hardenable resin component; (ii) a photoinitiator configured to create reactive species for initiating hardening of the photohardenable composition; and (iii) a stabilizer comprising a stable free radical-functionalized polymer; (b) irradiating one or more selected locations in the photohardenable composition with radiation including one or more wavelengths to initiate hardening of the photohardenable composition at the one or more selected locations in the photohardenable composition; and (c) optionally repeating step (b) at one or more of the same or different selected locations within the photohardenable composition until at least a portion of the article is formed.

In accordance with still yet another aspect of the invention, there is provided a method for spatially limiting photohardening of a photohardenable composition during formation of an article, the method comprising: (a) providing a volume of a photohardenable composition comprising (i) a hardenable resin component; (ii) a photoinitiator configured to create reactive species for initiating hardening of the photohardenable composition; (iii) an upconverting component configured to upconvert excitation light at one or more wavelengths in a first range of wavelengths to upconverted light at one or more wavelengths in a second range of wavelengths, wherein the upconverted light includes radiation including one more wavelengths for activating the photoinitiator; and (iv) a stabilizer comprising a stable free radical-functionalized polymer; (b) directing excitation light at one or more wavelengths in the first range of wavelengths into the volume of the photohardenable composition for upconversion by the upconverting component and initiating local hardening of the photohardenable composition at one or more selected locations within the volume of the photohardenable composition; and (c) optionally repeating step (b) at one or more of the same or a different selected location within the volume of the photohardenable composition until at least a portion of the article is formed.

In accordance with additional aspects of the invention, there are provided articles formed by the methods described herein.

In accordance with still a further aspect of the invention, there is provided a stabilizer for inclusion in a photohardenable composition including a hardenable resin component, and a photoinitiator, the stabilizer comprising a stable free radical-functionalized polymer, wherein the stabilizer is dispersible or dissolvable in the hardenable resin component. The photohardenable composition can optionally further include an upconverting component.

In accordance with still a further aspect of the invention, there is provided the use of a stabilizer in a photohardenable composition for three-dimensional printing, the photohardenable composition including a hardenable resin component and a photoinitiator, the stabilizer comprising a stable free radical-functionalized polymer, wherein the stabilizer is dispersible or dissolvable in the hardenable resin component. The photohardenable composition can optionally further include an upconverting component.

The foregoing, and other aspects and embodiments described herein and contemplated by this disclosure all constitute embodiments of the present invention.

It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

It is to be understood that both the foregoing general description and the following detailed description are exemplary and explanatory only and are not restrictive of the invention as claimed.

Other embodiments will be apparent to those skilled in the art from consideration of the description, from the claims, and from practice of the invention disclosed herein.

DETAILED DESCRIPTION OF THE INVENTION

Various aspects and embodiments of the present invention will be further described in the following detailed description.

The present invention relates to photohardenable compositions, methods for forming an article including a photohardenable composition, and methods for spatially limiting photohardening of a photohardenable composition during formation of an article. Preferred photohardenable compositions and methods include a hardenable resin component, a photoinitiator, and a stabilizer comprising a stable free radical functionalized polymer. The photohardenable compositions and methods can further include an upconverting component. The present invention also includes a stabilizer comprising a stable free radical-functionalized polymer for inclusion in a photohardenable composition, the use of a stable free radical-functionalized polymer in photohardenable compositions, and the use of a stabilizer comprising a stable-free radical functionalized polymer in methods including a photohardenable composition for forming an article.

In accordance with one aspect of the present invention, there is provided a photohardenable composition comprising: (i) a hardenable resin component; (ii) a photoinitiator configured to create reactive species for initiating hardening of the photohardenable composition when activated by radiation; and (iii) a stabilizer comprising a stable free radical-functionalized polymer.

In accordance with another aspect of the present invention, there is provided a photohardenable composition comprising: (i) a hardenable resin component; (ii) a photoinitiator configured to create reactive species for initiating hardening of the photohardenable composition when activated by radiation; (iii) an upconverting component configured to upconvert excitation light at one or more wavelengths in a first range of wavelengths to upconverted light including one or more wavelengths in a second range of wavelengths, wherein the upconverted light includes radiation at one or more wavelengths configured to activate the photoinitiator; and (iv) a stabilizer comprising a stable free radical-functionalized polymer.

In the various aspects and embodiments of the inventions described herein, radiation for activating a photoinitiator preferably includes one or more wavelengths selected or configured for activating the photoinitiator.

In accordance with a further aspect of the present invention, there is provided a stabilizer for inclusion in a photohardenable composition including a hardenable resin component, and a photoinitiator, the stabilizer comprising a stable free radical functionalized polymer, wherein the stabilizer is dispersible or dissolvable in the hardenable resin component. The photohardenable composition in which the stabilizer is included can further include an upconverting component.

Preferably, the stable-free radical functionalized polymer comprises a polymer chemically modified with one or more stable free radicals.

While not wishing to be bound by theory, it is believed that inclusion of a stabilizer comprising a stable free radical functionalized polymer in the photohardenable compositions and methods of the present invention can spatially limit the extent of cure, thereby improving spatial resolution and dimensional accuracy of an article formed therefrom by light-activated polymerization.

A stabilizer comprising a stable free radical functionalized polymer in accordance with the present invention advantageously has a lower molecular diffusivity in the photohardenable composition in which it is included than a molecule of the stable free radical not attached to a polymer. While not wishing to be bound by theory, it is believed that such lower molecular diffusivity can improve the thresholding effect of the stabilizer, e.g., by increasing the sharpness of gradient in cure from the uncured material outside of intended cure area or volume to the cured material inside the intended cure area or volume (also referred to herein as the cured-uncured gradient). Such increase in the sharpness of the cured-uncured gradient can facilitate an improvement in the spatial resolution of the pattern. Additionally, a stabilizer with decreased diffusivity can facilitate a reduction of the total amount of stabilizer which can diffuse into the intended cure area or volume from the boundaries during the time before cure or solidification sets in, thereby reducing the total amount of an inhibitory additive which must be consumed to effect cure or solidification and increasing the effective cure or solidification speed. These effects, e.g., increase in spatial resolution and increase in cure speed of patterning, are desirable for the implementation of two- and three-dimensional patterning techniques. Decreasing the molecular diffusivity of a stable free radical in light-activated methods of forming an article from photohardenable compositions can facilitate improvements in print speed and spatial resolution.

Inclusion of a stabilizer comprising a stable free radical-functionalized polymer in the photohardenable compositions and methods of the present invention can also prevent unintended curing or autopolymerization, particularly during storage or handling in the absence of oxygen, thereby improving shelf life and reusability of the photohardenable composition.

A stabilizer in accordance with the present invention can advantageously react readily with free radicals generated by a photoinitiator as well as with propagating radical chain ends to form stable covalent moieties which do not participate further in polymerization under typical processing conditions, which are generally at or near room temperature, and at the same time demonstrate decreased molecular diffusivity compared to the molecular diffusivity of bare stable free radicals (e.g., stable free radicals which are not attached or otherwise bound to a polymer.)

A stabilizer in accordance with the present invention can be particularly advantageous for inclusion in embodiments of photohardenable compositions described herein wherein the hardenable resin component is partially or fully hardenable by free radical polymerization or cross-linking mechanisms and in methods described herein wherein the photohardenable composition is partially or fully hardened by free radical polymerization or cross-linking mechanisms.

Furthermore, stable free radical functionality included in the stabilizer described herein comprising a stable free radical-functionalized polymer can maintain inhibitory activity in the absence of oxygen, unlike inhibitor additives such as hindered phenols which rely on dissolved oxygen first reacting with free radicals.

Stable free radicals for inclusion in the stabilizer described herein include any known stable free radical agent that can inhibit polymerization. Examples include, but are not limited to, nitroxide free radicals, 2,2,6,6-tetramethyl-1-piperidinyloxy, 4-acetamido-2,2,6,6-tetramethylpiperidine-1-oxyl, 4-amino-2,2,6,6-tetramethylpiperidine-1-oxyl, 2-azaadamantane-N-oxyl, 4-carboxy-2,2,6,6-tetramethylpiperidine-1-oxyl, 4-hydroxy-2,2,6,6-tetramethylpiperidine-1-oxyl, 4-hydroxy-2,2,6,6-tetramethylpiperidine 1-oxyl benzoate, 4-(2-iodoacetamido)-2,2,6,6-tetramethylpiperidine-1-oxyl, 4-isothiocyanato-2,2,6,6-tetramethylpiperidine-1-oxyl, 4-maleimido-2,2,6,6-tetramethyl-1-piperidinyloxyl, 4-methoxy-2,2,6,6-tetramethyl-1-piperidinyloxyl, 4-oxo-2,2,6,6-tetramethyl-1-piperidinyloxyl, 4-phosphonooxy-2,2,6,6-tetramethyl-1-piperidinyloxyl, 2,2,6,6-tetramethylpiperidine-1-oxyl, 4-methacryloyloxy-2,2,6,6-tetramethylpiperidine-1-oxyl, 2,2,6,6-tetramethyl-4-(methylsulfonyloxy)-1-piperidinooxyl, 2,2-di(4-tert-octylphenyl)-1-picrylhydrazyl, 2,2-diphenyl-1-(2,4,6-trinitrophenyl)hydrazyl, 4,4-dimethyl-3-oxazolidinyloxy, 4',4'-dimethylspiro(5α-cholestane-3,2'-oxazolidin)-3'-yloxyl, 2-(14-carboxytetradecyl)-2-ethyl-4,4-dimethyl-3-oxazolidinyloxyl, 2-(4-methoxy-4-oxobutyl)-4,4-dimethyl-2-tridecyl-3-oxazolidinyloxyl, 2,2,5,5-tetramethyl-1-pyrrolidinyloxy, 3-(aminomethyl)-2,2,5,5-tetramethyl-1-pyrrolidinyloxyl, 3-carbamoyl-2,2,5,5-tetramethyl-1-pyrrolidineoxyl, 2,2,5,5-tetramethyl-3-carbamido-3-pyrroline-1-oxyl, 3-(carboxy)-2,2,5,5-tetramethyl-1-pyrrolidinyloxyl, 3-cyano-2,2,5,5-tetramethyl-1-pyrrolidinyloxyl, 2,6-di-tert-butyl-α-(3,5-di-tert-butyl-4-oxo-2,5-cyclohexadien-1-ylidene)-p-tolyloxyl, 3-(2-iodoacetamido)-2,2,5,5-tetramethyl-1-pyrrolidinyloxyl, 3-maleimido-2,2,5,5-tetramethyl-1-pyrrolidinyloxyl, 1,1-dimethylethyl-2-methyl-1-phenylpropyl nitroxide, and tris(4-bromophenyl)ammoniumyl hexachloroantimonate. Many of these stable free radicals are simple derivatives of a limited set of stable free radical moieties such as TEMPO (2,2,6,6-tetramethylpiperidine-1-oxyl), PROXYL (2,2,5,5-tetramethyl-1-pyrrolidinyloxyl), and DOXYL (4,4-dimethyl-3-oxazolidinyloxyl). Other derivatives of TEMPO, PROXYL, and DOXYL may also be suitable.

A common feature of stable free radicals, such as those listed above, is relatively low molecular weight, for example ranging from less than 1000 g/mol, less than 500 g/mol, less than 300 g/mol to less than 200 g/mol.

A stabilizer including a polymer functionalized with one or more stable free radicals provides a stabilizer having a higher molecular weight and larger molecular size, which can facilitate a lower molecular diffusivity compared to a bare stable free radical molecule (e.g., not attached or otherwise bound to a polymer).

A stabilizer in accordance with the present invention can include a stable free radical-functionalized polymer that includes at least one stable free radical functional group. A stabilizer can comprise a functionalized polymer that includes more than one stable free radical. The number of stable free radicals attached to a single polymer chain may be, for example, 1, 2, 3, 4, 5 or more, 10 or more, 100 or more, 1000 or more, or a higher number. When the polymer is functionalized with more than one stable free radical, each of the stable free radicals attached to the polymer can independently be the same or different. The added molecular weight and spatial extent of the attached polymer chain decreases the molecular diffusivity of the stable free radical(s), providing the benefits discussed above when incorporated as a stabilizer in a photohardenable composition or method described herein. Stable free radicals attached to a polymer may also be referred to herein as stable free radical moieties or stable free radical functional groups.

Polymers for inclusion in a stabilizer in accordance with the present invention may have any structure, for example but not limited to linear, branched, cyclic, star, hyperbranched, dendritic, comb, ladder, catenane, or rotaxane. The polymer may comprise multiple such structures in combination. The polymer may assemble supramolecularly to form larger structures, for example but not limited to helices, fibrils, crystals, sheets, vesicles, and nanoparticles. One or more polymers may be covalently or noncovalently bound to a nanoparticle.

The polymer may comprise one or more types of monomer units in any sequence including, but not limited to, homopolymer, random copolymer, alternating copolymer, gradient copolymer, block copolymer, or combinations thereof. The polymer may have any tacticity, including, but not limited to, atactic, isotactic, and syndiotactic.

The polymer may have any electric charge or combination of electric charges, including, but not limited to, neutral, positive, negative, or zwitterionic.

The polymer may be of any molecular weight, for example greater than 200 g/mol, greater than 400 g/mol, greater than 1,000 g/mol, greater than 2,000 g/mol, greater than 5,000 g/mol, greater than g/mol, greater than 100,000 g/mol, greater than 1,000,000 g/mol, or greater than 10,000,000 g/mol. Preferably the polymer has a molecular weight greater than 1,000 g/mol (e.g., greater than 2,000 g/mol, greater than 5,000 g/mol, greater than 10,000 g/mol, etc.) up to about 100,000 g/mol.

The polymer may bear one or more stable free radicals at any location along the polymer chain, including, but not limited to, one or more chain ends, one or more sites along the polymer backbone, as side groups or side chain ends, or at one or more sites on a catenane or rotaxane, or some combination thereof. The stable free radical moieties may originate from the initiator used to form the polymer, may originate from one or more of the monomers comprising the polymer, may be grafted to the polymer in a functionalization or derivatization treatment after polymerization, or may originate from some combination of these.

Including a stable free radical group at either or both ends of the polymer chain can be desirable for purposes of preparing a stabilizer.

Optionally, the polymer can further be functionalized with one or more other functionalities in addition to stable free radicals. Any such other functionalities can independently be the same as or different from any such additional functionality attached to the polymer. The polymer may comprise any combination of functional groups. Examples of other functionalities or functional groups, including, but are not limited to, hydrocarbon, alkyl, aryl, phenyl, alkene, vinyl, olefin, alkyne, amine, ammonium, amide, ester, ether, thioester, thioether, sulfide, carbamate, urethane, urea, thiocarbamate, thiourea, silane, siloxane, cyclosiloxane, disulfide, mercaptan, thiol, thiolate, sulfone, sulfate, peroxide, peroxyester, epoxide, oxetane, oxolane, oxazine, oxepin, pyrrole, pyrrolidone, pyran, furan, alkyl halide, aryl halide, acid halide, aldehyde, ketone, oxime, imine, carboxylic acid, carboxylate, enol, enolate, nitrile, isonitrile, cyanate, isocyanate, anhydride, nitro, nitroxide, phenol, phenolate, lactone, lactam, saccharide, aldol, carbonate, thiocarbonate, acetal, ketal, azine, phosphate, phosphine, and phosphonate. The polymer may contain complexed metals and dative bonds.

Examples of polymers which may be suitable include, but are not limited to, polyethylene, polypropylene, polybutylene, polyamides, polyesters, polycarbonate, polyethylene glycol, polyethylene oxide, polypropylene glycol, polypropylene oxide, polytetrahydrofuran, polytetramethyleneglycol, polytetramethylene oxide, polyepichlorohydrin, amine-terminated polyalkylene ethers, polyetheramines, polyether-block-amides, phenol novolacs, cresol novolacs, epoxy resins, polystyrene, polystyrene-co-maleic anhydride, polybutadiene, polyisoprene, polystyrene-co-butadiene-co-styrene, polystyrene-co-isoprene, polystyrene-co-acrylonitrile, polyacrylonitrile, polyacrylonitrile-co-butadiene-co-styrene, polyhydroxystyrene, polystyrene-co-divinylbenzene, polyphenylene oxide, polyetheretherketone, polyetherketoneketone, polyetherketone, polyetherimide, polysulfone, polyimide, polyamic acid, polyacrylates, polyacrylate copolymers, polymethacrylates, polymethacrylate copolymers, polyacrylamides, polyacrylamide copolymers, polymethacrylamides, polymethacrylamide copolymers, polyurethanes, polyurethane-ureas, polyureas, polybenzoxazines, polysiloxanes, polyphosphazenes, polysaccharides, polypeptides, chitin, chitosan, cellulose acetate, cellulose butyrate, cellulose nitrate, and nitrocellulose. One or more different polymers may be linked to form block copolymers.

One preferred class of polymers are amine-terminated polyalkylene ethers Amine-terminated polyalkylene ethers possess a number of useful properties, including amine groups suitable for reaction with other functional groups such as alkyl halides, aryl halides, carboxylic acids, acid halides, acid anhydrides, isocyanates, aldehydes, or acrylates; tunable hydrophilicity or hydrophobicity by selecting appropriate alkylene ether backbone (e.g. polyethylene glycol for hydrophilic behavior or polypropylene glycol for hydrophobic behavior); tunable amine reactivity by selecting appropriate end group (e.g. select from primary aliphatic amine, secondary aliphatic amine, and aryl amine; select degree of steric hindrance on the carbon adjacent to the amine); tunable molecular weight (e.g. from about 200 g/mol to 5000 g/mol or greater); tunable number of functional groups (e.g. from 1 to 3 or more); high solubility in a wide range of organic solvents; liquidness at room temperature; and low color. These properties make amine-terminated polyalkylene ethers highly suitable for post functionalization with an appropriate stable free radical to form a stabilizer.

Examples of amine-terminated polyalkylene ethers include but are not limited to poly(propylene glycol) bis(2-aminopropyl ether) and trimethylolpropane triqpoly(propylene glycol), amine terminated] ether; Jeffamine M-600, Jeffamine M-2005, Jeffamine M-1000, Jeffamine M-2070, Jeffamine M-2095, Jeffamine M-3085, Jeffamine D-230, Jeffamine D-400, Jeffamine D-2000, Jeffamine D-2010, Jeffamine D-4000, Jeffamine ED-600, Jeffamine ED-900, Jeffamine ED-2003, Jeffamine THF-100, Jeffamine THF-170, Jeffamine T-403, Jeffamine T-3000, and Jeffamine T-5000 from Huntsman Corp.; Polyetheramine D 230 and Polyetheramine D 2000 from BASF; and Versalink P-1000 from Evonik.

Stable-free radical functionalized polymers in accordance with the present invention can be prepared from one or more stable-free radicals and one or more monomers, oligomers, prepolymers, or polymers using coupling reactions well known in the literature.

A photohardenable composition in accordance with the present invention is particularly well-suited for use in forming an article, including, for example, in building a three-dimensional (3D) object, such as by 3D printing, especially volumetric three-dimensional-printing, and in building a two-dimensional pattern, such as by lithography.

Examples of light-activated polymerization techniques with which a photohardenable composition in accordance with the present invention can be beneficial include, but are not limited to, stereolithography (SLA), projection microstereolithography (PμSL), Digital Light Projection (DLP), low-force stereolithography (LFS), digital light synthesis (DLS), continuous liquid interface production (CLIP), tomographic 3D printing, two-wavelength volumetric 3D printing, and two-photon printing (2PP).

Information that may be useful in connection with two-wavelength volumetric 3D printing includes the methods described in U.S. Pat. Nos. 4,041,476, 4,078,229, 4,238,840, 4,466,080, 4,471,470, and 4,333,165 to Swainson. Such patents disclose concepts relating to forming a three-dimensional figure in situ in a medium by causing two dissimilar radiation beams to intersect in the medium. In the described process, the X, Y and Z axes are scanned within a volume of a photohardenable material; there is no stage and scanning is not limited to the X, Y plane as it is in the Hull process. Alternatively, the x, y cross-sectional method described in U.S. Pat. No. 4,575,330 to Hull may be useful. Other information that may be useful includes U.S. Pat. No. 10,843,410 of Lippert, et al. for "System And Method For A Three-Dimensional Optical Switch Display (OSD) Device", (including examples of photoswitchable photoinitiators) each of the foregoing and other references cited herein being hereby incorporated herein by reference in its entirety.

Preferably, the hardenable resin component included in the photohardenable composition is selected to achieve an optically transparent or clear liquid, which is desirable in processes and systems in which light (e.g., radiation or excitation light) is directed into the composition and/or in which light is emitted from light-emitting species (e.g., an upconverting component) that may optionally be included in the composition.

Photohardenable compositions in accordance with the present invention can be pourable, which is particularly desirable for handling purposes and for use of the compositions in three-dimensional printing processes and systems.

Photohardenable compositions in accordance with the present invention can have a viscosity in a range from about 0.5 centipoise to about 10,000,000 centipoise.

Examples of viscosities under the conditions in which methods in accordance with the present invention can be carried out, that may be useful include, for example, but without limitation, greater than 1 centipoise, greater than 1,000 centipoise, and greater than 5,000 centipoise.

Higher viscosities may be desirable, for example, when printing an article, e.g., a three-dimensional object, that is suspended or floating within a volume of a photohardenable composition that is included in a container or build chamber. In such instances, a higher viscosity can be desirable for keeping the object suspended or floating while being printed. A photohardenable composition having a viscosity of about 1,000 centipoise or higher, 2,000 centipoise or higher, 4,000 centipoise or higher, or even higher can be preferred in this regard.

It may alternatively or additionally be desirable for a photohardenable composition to display non-Newtonian rheological behavior. By way of example, and without limitation, a photohardenable composition displaying non-Newtonian rheological behavior can be preferred for inclusion in a method in which an article is printed in a suspended state within a volume of the photohardenable composition. For a photohardenable composition displaying non-Newtonian rheological behavior, steady shear viscosities can be, for example, less than 30,000 centipoise, less than 20,000 centipoise, less than 10,000 centipoise, less than 5,000 centipoise, or less than 1,000 centipoise.

Steady shear viscosity refers to the plateau value of the viscosity measured under continuous constant-rate shear, such as at shear rates ranging from about 0.00001 $s^{-1}$ to about 1000 $s^{-1}$.

Photohardenable compositions in accordance with the present invention can further include one or more additives. Examples of such additives include, but are not limited to, thixotropes, light blockers, defoamers, oxygen scavengers, and non-reactive solvent diluents. Any additive can be a single additive or a mixture of additives. For example, a light blocker additive can comprise a single light blocker or a mixture of two or more light blockers. Additives are preferably selected so that they do not react with other components or additives included in the photohardenable composition.

A photohardenable composition in accordance with the various aspects of the present invention can include, for example, but without limitation, from about 0.0005 to about 95, from about 0.5 to about preferably from about 40 to about 95, weight percent hardenable resin component; from about to about 25, from about 0.1 to about 25, preferably from about 0.2 to about 10, weight percent photoinitiator; and from about 0.000001 to about 1, from about 0.0005 to about 1, and preferably from about 0.00002 to about 0.1, weight percent stabilizer.

A photohardenable composition further including an upconverting component can further include, for example, from about 0.1 to about 85, preferably from about 1 to about 20, weight percent upconverting component.

A photohardenable composition can optionally further include, for example, any one or more of the following:

from about 0.05 to about 15, preferably from about 1 to about 10, weight percent thixotrope, from about 0.005 to about 1 weight percent defoamer, from about 0.005 to about 10 weight percent light blocker.

Unless otherwise indicated, specified weight percents are based on the total weight of the photohardenable composition.

Additional information concerning various components that can be included in photohardenable compositions and methods in accordance with various aspects and embodiments of the present invention is provided below.

A hardenable resin component suitable for inclusion in a photohardenable composition in accordance with the present invention may comprise any hardenable resin suitable for hardening, e.g., by free radical polymerization, cationic polymerization, anionic polymerization, insertion polymerization such as Ziegler-Natta or metallocene-catalyzed olefin polymerizations, ring opening polymerization (e.g. of epoxides, oxetanes, benzoxazines, silicones, lactones, carbonates, etc.), metathesis polymerization (e.g. of cyclic or acyclic olefins), condensation polymerization (e.g. polyesters, polyamides, polyurethanes), or cross-linking.

Examples of hardenable resin components that may be included in the photohardenable composition include, for example, without limitation, monomers, oligomers such as dimers or trimers, pre-polymers, and polymers, or mixtures including one or more of the foregoing, such as, for example, without limitation, free-radically polymerizable or cross-linkable ethylenically-unsaturated species including, for example, acrylates, methacrylates, acrylamides, methacrylamides, vinyl ethers, vinyl esters, vinyl amides, vinyl imidazoles, vinyl oxazolidinones such as 5-methyl-3-vinyl-1,3-oxazolidin-2-one, vinyl carbazoles, maleimides, methylene malonates, allyl ethers, cyanoacrylates, cyclopolymerizable monomers such as methyl 2-((allyloxy)methyl) acrylate, and certain vinyl compounds such as styrenes), as well as cationically-polymerizable monomers and oligomers and cationically-cross-linkable polymers (which are most commonly acid-initiated and which include, for example, epoxies, vinyl ethers, cyanate esters, oxetanes, lactones, lactams, cyclosiloxanes, benzoxazines, etc.), and the like, and mixtures thereof.

A non-limiting list of examples of such suitable hardenable resins include ethylenically-unsaturated species described, for example, by Palazzotto et al. in U.S. Pat. No. 5,545,676 at column 1, line 65, through column 2, line 26, that include mono-, di-, and poly-acrylates and methacrylates (for example, methyl acrylate, methyl methacrylate, ethyl acrylate, isopropyl methacrylate, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,3-propanediol diacrylate, 1,3-propanediol dimethacrylate, trimethylolpropane triacrylate, 1,2,4-butanetriol trimethacrylate, 1,4-cyclohexanediol diacrylate, pentaerythritol triacrylate, pentaerythritol tetraacrylate, pentaerythritol tetramethacrylate, sorbitol hexacrylate, bis[1-(2-acryloxy)]-p-ethoxyphenyldimethylmethane, bis[1-(3-acryloxy-2-hydroxy)]-p-propoxyphenyldimethylmethane, trishydroxyethyl-isocyanurate trimethacrylate, the bis-acrylates and bis-methacrylates of polyethylene glycols of molecular weight about 200-500, copolymerizable mixtures of acrylated monomers such as those of U.S. Pat. No. 4,652,274, and acrylated oligomers such as those of U.S. Pat. No. 4,642,126); unsaturated amides (for example, methylene bis-acrylamide, methylene bis-methacrylamide, 1,6-hexamethylene bis-acrylamide, diethylene triamine tris-acrylamide and beta-methacrylaminoethyl methacrylate); vinyl compounds (for example, styrene, diallyl phthalate, divinyl succinate, divinyl adipate, and divinyl phthalate); and the like; and mixtures thereof. Suitable reactive polymers include polymers with pendant (meth)acrylate groups, for example, having from 1 to about 50 (meth)acrylate groups per polymer chain. Examples of such polymers include aromatic acid (meth)acrylate half ester resins. Other useful reactive polymers curable by free radical chemistry include those polymers that have a hydrocarbyl backbone and pendant peptide groups with free radically polymerizable functionality attached thereto, such as those described in U.S. Pat. No. 5,235,015 (Ali et al.). Mixtures of two or more monomers, oligomers, and/or reactive polymers can be used if desired.

Suitable cationically-reactive species are described, for example, by Oxman et al. in U.S. Pat. Nos. 5,998,495 and 6,025,406 and include epoxy resins. Such materials, broadly called epoxides, include monomeric epoxy compounds and epoxides of the polymeric type and can be aliphatic, alicyclic, aromatic, or heterocyclic. These materials generally have, on the average, at least 1 polymerizable epoxy group per molecule (preferably, at least about 1.5 and, more preferably, at least about 2). The polymeric epoxides include linear polymers having terminal epoxy groups (for example, a diglycidyl ether of a polyoxyalkylene glycol), polymers having skeletal oxirane units (for example, polybutadiene polyepoxide), and polymers having pendant epoxy groups (for example, a glycidyl methacrylate polymer or copolymer). The epoxides can be pure compounds or can be mixtures of compounds containing one, two, or more epoxy groups per molecule. These epoxy-containing materials can vary greatly in the nature of their backbone and substituent groups. For example, the backbone can be of any type and substituent groups thereon can be any group that does not substantially interfere with cationic cure at room temperature. Illustrative of permissible substituent groups include halogens, ester groups, ethers, sulfonate groups, siloxane groups, nitro groups, phosphate groups, and the like. The molecular weight of the epoxy-containing materials can vary from about 58 to about 100,000 or more.

Useful epoxy-containing materials include those which contain cyclohexene oxide groups such as epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexane carboxylate, and bis(3,4-epoxy-6-methylcyclohexylmethyl) adipate. A more detailed list of useful epoxides of this nature is set forth in U.S. Pat. No. 3,117,099.

Other epoxy-containing materials that are useful include glycidyl ether monomers. Examples are glycidyl ethers of polyhydric phenols obtained by reacting a polyhydric phenol with an excess of a chlorohydrin such as epichlorohydrin (for example, the diglycidyl ether of 2,2-bis-(2,3epoxypropoxyphenol)-propane). Additional examples of epoxides of this type are described in U.S. Pat. No. 3,018,262, and in Handbook of Epoxy Resins, Lee and Neville, McGraw-Hill Book Co., New York (1967).

Suitable hardenable resins also can include epoxy resins. Examples of such epoxy resins include octadecylene oxide, epichlorohydrin, styrene oxide, vinyl cyclohexene oxide, glycidol, glycidylmethacrylate, diglycidyl ethers of Bisphenol A, vinylcyclohexene dioxide, 3,4epoxycyclohexylmethyl-3,4-epoxycyclohexene carboxylate, 3,4-epoxy-6-methylcyclohexylmethyl-3,4-epoxy-6-methyl-cyclohexene carboxylate, bis(3,4-epoxy-6-methylcyclohexylmethyl) adipate, bis(2,3-epoxycyclopentyl) ether, aliphatic epoxy modified from polypropylene glycol, dipentene dioxide, epoxidized polybutadiene, silicone resin containing epoxy functionality, flame retardant epoxy resins, 1,4-butanediol diglycidyl ether of phenolformaldehyde novolak, resorcinol diglycidyl ether, bis(3,4-epoxycyclohexyl)adipate, 2-(3,4epoxycyclohexyl-5,5-spiro-3,4-epoxy) cyclohexane-meta-dioxane, vinylcyclohexene monoxide 1,2-epoxyhexadecane, alkyl glycidyl ethers such as alkyl $C_8$-$C_{10}$ glycidyl ether, alkyl $C_{12}$-$C_{14}$ glycidyl ether, butyl glycidyl ether, cresyl glycidyl ether, p-tert-butylphenyl glycidyl ether, polyfunctional glycidyl ethers such as diglycidyl ether of 1,4-butanediol, diglycidyl ether of neopentyl glycol, diglycidyl ether of cyclohexanedimethanol, trimethylol ethane triglycidyl ether, trimethylol propane triglycidyl ether, polyglycidyl ether of an aliphatic polyol, polyglycol diepoxide, bisphenol F epoxides, and 9,9-bis[4-(2,3-epoxypropoxy)-phenyl]fluorenone.

Other useful epoxy resins comprise copolymers of acrylic acid esters of glycidol (such as glycidylacrylate and glycidylmethacrylate) with one or more copolymerizable vinyl compounds. Examples of such copolymers are 1:1 styrene-glycidylmethacrylate, 1:1 methylmethacrylate-glycidylacrylate, and a 62.5:24:13.5 methylmethacrylate-ethyl acrylate-glycidylmethacrylate. Other useful epoxy resins are well known and contain such epoxides as epichlorohydrins, alkylene oxides (for example, propylene oxide), styrene oxide, alkenyl oxides (for example, butadiene oxide), and glycidyl esters (for example, ethyl glycidate).

Useful epoxy-functional polymers include epoxy-functional silicones such as those described in U.S. Pat. No. 4,279,717 (Eckberg). These are polydimethylsiloxanes in which 1-20 mole % of the silicon atoms have been substituted with epoxyalkyl groups (preferably, epoxy cyclohexylethyl, as described in U.S. Pat. No. 5,753,346 (Kessel)).

Blends of various epoxy-containing materials can also be utilized. Such blends can comprise two or more weight average molecular weight distributions of epoxy-containing compounds (such as low molecular weight (below 200), intermediate molecular weight (about 200 to 10,000), and higher molecular weight (above about 10,000)). Alternatively, or additionally, the epoxy resin can contain a blend of epoxy-containing materials having different chemical natures (such as aliphatic and aromatic) or functionalities (such as polar and non-polar). Other cationically-reactive polymers (such as vinyl ethers and the like) can additionally be incorporated, if desired.

Additional examples of epoxies include aromatic glycidyl epoxies and cycloaliphatic epoxies.

Suitable cationically-reactive species also include vinyl ether monomers, oligomers, and reactive polymers (for example, methyl vinyl ether, ethyl vinyl ether, tert-butyl vinyl ether, isobutyl vinyl ether, triethyleneglycol divinyl ether, trimethylpropane trivinyl ether, divinyl ether resins, and mixtures thereof. Blends (in any proportion) of one or more vinyl ether resins and/or one or more epoxy resins can also be utilized. Polyhydroxy-functional materials (such as those described, for example, in U.S. Pat. No. 5,856,373 (Kaisaki et al.)) can also be utilized in combination with epoxy- and/or vinyl ether-functional materials.

A hardenable resin component can comprise one or more multifunctional acrylate monomers. SR399 from Sartomer (which contains a pentaacrylate monomer) is an example of a preferred component for inclusion in the photohardenable composition.

Aliphatic urethane acrylates are also preferred hardenable resin components for inclusion in the photohardenable composition.

Mixtures of multifunctional acrylate monomers, such as SR399, and aliphatic urethane acrylates can also be used.

An acrylamide monomer can also be included in a photohardenable composition to act as a solvent for mixing the photoinitiator in the hardenable resin component.

Additional information concerning monomers, oligomers, prepolymers, and/or polymers that may be useful is described in WO 2019/025717 A1 of Baldeck, et al., published Feb. 7, 2019, International Application No. Application No. PCT/US2019/063629, of Congreve, et al., filed Nov. 27, 2019, which published as WO 2020/113018 A1 on Jun. 4, 2020, and U.S. Pat. No. 7,005,229 of Nirmal et al, issued Feb. 28, 2006, each of which is hereby incorporated herein by reference in its entirety.

A photoinitiator for inclusion in a photohardenable composition in accordance with the present invention can be readily selected by one of ordinary skill in the art, taking into account its suitability for the mechanism to be used to initiate hardening (e.g., polymerization, cross-linking, curing, etc.) as well as its suitability for and/or compatibility with the hardenable resin component and other components of the photohardenable composition.

A photoinitiator can comprise a single photoinitiator or a combination of photoinitiators or a photoinitiator system including two or more components, at least one of which is a photoinitiator.

Selection of a photoinitiator is generally made taking into consideration the absorption band of the photoinitiator and the wavelength(s) of the radiation or light that will be used to activate the photoinitiator so that there is a match or at least an overlap between the two. By way of non-limiting examples, photoinitiators are available that can be activated by UV or visible wavelength light. Other factors, e.g., absorption coefficients, rate constants of the primary radicals toward the hardenable resin component, possible side reactions, light intensity can also be taken into consideration and balanced in the selection process. See, for example, A, Eibel, et al., "Choosing the ideal photoinitiator for free radical photopolymerizations: predictions based on simulations using established data", Polym. Chem., 2018, 9, 5107-5115.

A preferred photoinitiator initiates polymerization or cross-linking of the hardenable resin component by free radical reactions.

Preferably, a preferred photoinitiator that initiates polymerization or cross-linking of the hardenable resin component by free radical reactions is included in a photohardenable composition that includes a hardenable resin component that is polymerizable or cross-linkable by free radical reactions.

For example, a photoinitiators may form free radicals or cations upon initiation. Examples of photoinitiators, but are not limited to, 2-isopropylthioxanthone, benzophenone, 2,2-azobisisobutyronitrile, camphorquinone, diphenyltrimethylbenzoylphosphine oxide (TPO), HCP (1-hydroxycyclohexylphenylketone), B APO (phenylbis-2,4,6-(trimethylbenzoyl)phosphine oxide), Speedcure VLT (Bis(2,6-difluoro-3-(1-hydropyrrol-1-yl)phenyl)titanocene). Other examples include Norrish Type-1 and Norrish Type-2 initiators.

An example of a photoinitiator includes a free radical photoinitiator system including a dye (e.g., a ketocoutnarin dye), an iodonium salt, and a borate salt which generates free radicals capable of hardening the hanlenable resin component upon excitation of the dye (e.g., a ketocoumarin dye) by radiation and energy and electron transfer reactions between the dye (e.g., a ketocoumarin dye) and its reaction products. This photoinitiator system can be activated by radiation in a range of wavelengths from about 440 to about 510 nm.

Additional information concerning a free radical photoinitiator system comprising: a ketocoumarin dye, an iodonium salt, and a borate salt and photohardenable compositions and methods including same can be found in U.S. Application No. 63/091,863 of Arndt, et al., filed Oct. 14, 2020 and U.S. Application No. 63/121,906 of Arndt, et al., filed Dec. 5, 2020, each of which is hereby incorporated herein by reference in its entirety.

A photohardenable composition is typically cured using actinic radiation, such as UV radiation, e-beam radiation, visible radiation, or any combination thereof. The skilled practitioner can select a suitable radiation source and range(s) of wavelengths for a particular application without undue experimentation.

A photoinitiator included in a photohardenable composition described herein that further includes an upconverting component is preferably activated by one or more wavelengths included in upconverted light and not activated by the excitation light being used to excite the upconverting component.

Information concerning other photoinitiators that may be useful includes WO 2019/025717 A1 of Baldeck et al., published Feb. 7, 2019, and International Application No. Application No. PCT/US2019/063629, of Congreve, et al., filed Nov. 27, 2019, which published as WO 2020/113018 A1 on Jun. 4, 2020, each of which is hereby incorporated herein by reference in its entirety.

In various aspects and embodiments of the present invention, a photohardenable composition and method in accordance with the present invention optionally can further include an upconverting component configured to upconvert excitation light at one or more wavelengths in a first range of wavelengths to upconverted light including one or more wavelengths in a second range of wavelengths, wherein the upconverted light includes radiation at one or more wavelengths configured to activate the photoinitiator. The upconverting component can absorb excitation light at one or more wavelengths in a first range of wavelengths and emit upconverted light including one or more wavelengths in a second range of wavelengths. The wavelength(s) of the upconverted light in the second range of wavelengths is shorter than wavelengths of the excitation light in the first range of wavelengths.

An upconverting component can comprises one or more compositions that alone or in combination can absorb light at one or more wavelengths in a first range of wavelengths and emit light at one or more wavelengths in a second range of wavelengths, the second range of wavelengths being shorter than the first range of wavelengths.

An upconverting component preferably comprises a sensitizer and an annihilator, the sensitizer being selected to absorb excitation light at one or more wavelengths in the first range of wavelengths and the annihilator being selected to emit light at one or more wavelengths in the second range of wavelengths after transfer of energy from the sensitizer to the annihilator.

Methods in accordance with the present invention including an upconverting component can be useful for printing three-dimensional objects or other articles from photohardenable compositions which can be solidified at volumetric positions impinged upon by excitation light in the first range of wavelengths by upconversion-induced photopolymerization, cross-linking, or hardening. Preferably, the upconversion comprises triplet upconversion (or triplet-triplet annihilation, TTA) which may be used to produce light of a higher energy relative to light used to photoexcite the sensitizer or annihilator.

An annihilator can comprise molecules capable of receiving a triplet exciton from a molecule of the sensitizer through triplet-triplet energy transfer, undergo triplet fusion with another annihilator molecule triplet to generate a higher energy singlet that emits light in a second range of wavelengths to excite the photoinitiator to initiate polymerization or cross-linking of the hardenable resin component and the photohardenable composition. Examples of annihilators include, but are not limited to, polycyclic aromatic hydrocarbons, e.g., anthracene, anthracene derivatives (e.g., 9,10-bis(triisopropysilyl)ethynyl)anthracene, 9,10-diphenyl anthracene (DPA) 9,10-dimethylanthracene (DMA), 2-chloro-9,10-diphenylanthracene, 2-carbonitrile-9,10-diphenylanthracene, 9,10-bis(phenylethynyl)anthracene (BPEA), 2-chloro-9,10-bis (phenylethynyl) anthracene (2CBPEA), pyrene and or perylene (e.g., tetra-t-butyl perylene (TTBP). Mixtures including one or more of the foregoing can also be used. The above anthracene molecules can be substituted or unsubstituted and/or functionalized with a halogen. Preferred halogenated anthracene derivatives include, for example, DPA or 9,10-bis(triisopropysilyl) ethynyl)anthracene further functionalized with a halogen (e.g., fluorine, chlorine, bromine, iodine), more preferably at the 2 or at the 2 and 6 position. Bromine can be a preferred halogen. Fluorescent organic dyes can be preferred.

Preferably the annihilator comprises a molecule capable of receiving a triplet exciton from a molecule of the sensitizer through triplet energy transfer and undergoing triplet fusion with another annihilator molecule triplet to generate a higher energy singlet that emits light in the second range of wavelengths.

Preferred annihilators emit upconverted light in a second range of wavelengths from about 300 to about 600 nm, from about 400 nm to about 500 nm. More preferably the second range of wavelength is from about 360 nm to about 420 nm, about 400 nm to about 480 nm, from about 440 to about 510 nm, from about 450 nm to about 520 nm, from about 460 nm to about 530 nm.

A sensitizer can comprise at least one molecule capable of passing energy from a singlet state to a triplet state when it absorbs the photonic energy of excitation light in a first range of wavelengths. Examples of sensitizers include, but are not limited to, porphyrins, metalloporphyrins (e.g., palladium tetraphenyl tetrabutyl porphyrin (PdTPTBP), platinum octaethyl porphyrin (PtOEP), octaethyl-porphyrin palladium (PdOEP), palladium-tetraphenylporphyrin (PdTPP), palladium-meso-tetraphenyltetrabenzoporphyrin (PdPh4TBP), 1,4,8,11,15,18,22,25-octabutoxyphthalocyanine (PdPc (OBu)), 2,3-butanedione (or diacetyl), which can be substituted or unsubstituted, derivatives of any of the foregoing, or a combination of several of the above molecules. Other examples of sensitizers include osmium sensitizers. See, for example, R. Haruki, et al, Chem. Commun., 2020, Advance Article accepted 13 May 2020 and published 13 May 2020, the abstract of which is available at https://doi.org/10.1039/DOCCO2240C, which paper is hereby incorporated herein by reference.

Preferred sensitizers absorb excitation light in a first range of wavelengths from about 660 to about 800 nm. Preferably the first range of wavelengths is from about 680 nm to about 740 nm.

A consideration in selecting a sensitizer/annihilator pair may include the compatibility of the pair with the photoinitiator being used.

An upconverting component can preferably comprise upconverting nanoparticles for absorbing light at one or more wavelengths in a first range of wavelengths and emitting upconverted light at one or more wavelengths in a second range of wavelengths. The upconverting nanoparticles preferably include a sensitizer and an annihilator, the sensitizer being selected to absorb light at one or more wavelengths in the first range of wavelengths and the annihilator being selected to emit upconverted light at one or more wavelengths in the second range of wavelengths after transfer of energy from the sensitizer to the annihilator.

Upconverting nanoparticles preferably have an average particle size less than the wavelength of the exciting light. Examples of preferred average particle sizes are less than 100 nm, less than 80 nm, less than 50 nm, although still larger, or smaller, nanoparticles can also be used. Most preferably, the upconverting nanoparticles have an average particle size that creates no appreciable light scattering.

Preferably, at least a portion of upconverting nanoparticles include a core portion including the sensitizer and annihilator and an encapsulating shell over at least a portion, and preferably substantially all, of an outer surface of the core portion.

More preferably, at least a portion of upconverting nanoparticles include a core portion (also referred to herein as a core) that includes a sensitizer, an annihilator, and a medium and an encapsulating coating or a shell (e.g., silica or other metal oxide) around at least a portion, and more preferably all, of the outer surface of the core portion.

A preferred medium included in a core including a medium comprises a liquid. A liquid can facilitate proximity of the sensitizer and annihilator included in the core allowing for collisions that facilitate energy transfer between the sensitizer and annihilator also included in the core. A liquid included in the core can comprise a liquid that is substantially polar or substantially nonpolar. For example, the liquid can comprise a solvent that is substantially polar or miscible in water, or one that is substantially nonpolar or is substantially immiscible in water, e.g., such that it forms a separate phase when mixed with water (even if some portions of the solvent can dissolve in water). Non-limiting examples of substantially polar solvents include water, or other aqueous fluids, such as ethanol. In some embodiments, an amphiphilic solvent may be used. Non-limiting examples of substantially amphiphilic or non-polar solvents include carboxylic acids such as oleic acid, stearic acid, arachidonic acid, linolenic acid, or other similar carboxylic acids with shorter or longer aliphatic chains. In some embodiments, a non-polar solvent may be used. Additional examples of nonpolar or amphiphilic solvents include, but are not limited to, trimethlybenzene, trichlorobenzene, chloroform, toluene, or the like.

Non-limiting examples of a core including a sensitizer, an annihilator, and a liquid can include a micelle or a liposome. A micelle (which may typically be formed from one or more surfactants, e.g., having a relatively hydrophilic portion and a relatively hydrophobic portion.) may have a substantially spherical shape, e.g., where the hydrophilic portion defines an exterior portion of the micelle, while the hydrophobic portion defines an interior portion of the micelle. Liposomes are similar to micelles, except that instead of a single layer, the surfactants form a bilayer, and the interior portion is typically hydrophilic rather than hydrophobic. However, the interior of the bilayer is typically hydrophobic.

Preferably upconverting nanoparticles include a core portion that includes a sensitizer, an annihilator, and a liquid (e.g., oleic acid) and an encapsulating coating or a shell (e.g., silica) around the outer surface of the core portion. The core can preferably comprise a micelle, that includes the sensitizer and annihilator and a liquid in which the sensitizer and annihilator are dispersed. (A micelle is typically formed from one or more surfactants, e.g., having a relatively hydrophilic portion and a relatively hydrophobic portion.) Examples of upconverting nanoparticles include, but are not limited to, nanocapsules described in International Application No. PCT/US2019/063629, of Congreve, et al., filed Nov. 27, 2019 (which published as WO 2020/113018 A1 on Jun. 4, 2020) which is hereby incorporated herein by reference in its entirety. Other information concerning nanocapsules that may be useful includes S. Sanders, et al., "Photon Upconversion in Aqueous Nanodroplets", J. Amer. Chem. Soc. 2019, 141, 9180-9184, which is hereby incorporated herein by reference in its entirety.

Optionally other components may be included within the interior portion of the core, e.g., hydrophobic liquids or solvents, such as non-polar or amphiphilic solvents, including by way of example, but not limited to, trimethyl benzene, trichlorobenzene, chloroform, etc.

When the core portion further includes a liquid, the core portion preferably includes the sensitizer at a concentration in a range from about $10^{-6}$ M to about $10^{-2}$ M mg/ml and the annihilator at a concentration in a range from about $10^{-4}$ M to about $10^{-1}$ M.

A nanoparticle including a core and a shell wherein the core includes the sensitizer, the annihilator, and a medium, preferably comprising a liquid, may also be referred to herein as a nanocapsule.

Upconverting nanoparticles can further include functional groups or other surface-modifying agents on a portion or all of the surface thereof for facilitating inclusion (e.g., distribution, dispersion, etc.) of the nanoparticles in other materials and/or liquids. Surfactants and other materials useful as surface treatments are commercially available. Optionally an upconverting nanoparticle can include a combination of one or more chemically distinct functional groups or other surface-modifying agents on the outer surface thereof. Examples include, but are not limited to, poly-ethylene glycols, polyacrylates, polyvinyl esters, polyvinyl amides, etc. For example, inclusion of a surfactant comprising polyethylene glycol functionality on the outer surface of nanoparticles can facilitate dispersion thereof in a hydrophilic medium. Examples of additional surface treatment materials for functionalizing the nanoparticle surfaces include, but are not limited to, poly-ethylene glycols, silanes, for example, but not limited to, PEG-silanes, (3-aminopropyl)triethoxysilane, (3-glycidyloxypropyl)trimethoxysilane, 2-[methoxy(polyethyleneoxy)$_{9-12}$propyl]trimethoxysilane, 3-glycidoxypropyldimethoxymethylsilane, Isooctyltrimethoxysilane, N-(2-aminoethyl)-3-aminopropyltrimethoxysilane, N-(triethoxysilylpropyl)-O-poly(ethylene oxide)$_{4-6}$ urethane, O-[Methoxy(polyethylene oxide)]-N-(triethoxysilylpropyl)carbamate, octadecyltrimethoxysilane, triethoxyvinylsilane, trimethoxy[2-(7-oxabicyclo[4.1.0]hept-3-yl)ethyl]silane, trimethoxyphenylsilane, vinyltrimethoxysilane, 3-(trimethoxysilyl)propyl methacrylate, N-[3-(trimethoxysilyl)propyl]aniline.

Preferably, an excitation source for use with an upconverting component is selected to emit excitation light at one or more wavelengths in a first range of wavelengths which matches or at least overlaps a range of wavelengths in which the upconverting component absorbs and upconverts at least a portion of the absorbed light to light at one or more wavelengths in a second range of wavelengths (shorter than the first range of wavelengths) for activating an photoinitiator and initiating photohardening of the photohardenable composition in which it is included. When an upconverting component includes a sensitizer and an annihilator, such match or overlap preferably occurs between one or more wavelengths in a first range wavelengths emitted by the excitation light and one or more wavelengths in the first range of wavelengths absorbed by the sensitizer, whereupon the sensitizer transfers energy to an annihilator for generating upconverted light in a second range of wavelengths, the second range of wavelengths being shorter than the first range of wavelengths.

Excitation light may be visible light, ultraviolet light, or other suitable forms of electromagnetic radiation.

Other information that may be useful in connection with upconversion, sensitizers, annihilators, and use thereof includes International Application No. PCT/US2019/063629, of President And Fellows Of Harvard College, filed Nov. 27, 2019, which published as WO 2020/113018 A1 on Jun. 4, 2020; S. Sanders, et al., "Photon Upconversion in Aqueous Nanodroplets", J. Amer. Chem. Soc. 2019, 141, 9180-9184; International Application No. PCT/US2020/053765, of the President And Fellows Of Harvard College, filed Oct. 1, 2021, each of the foregoing being hereby incorporated herein by reference in its entirety. WO 2019/025717 A1 of Baldeck, et al., published Feb. 7, 2019, and International Application No. PCT/US2019/063629, of Congreve, et al., filed Nov. 27, 2019, which published as WO 2020/113018 A1 on Jun. 4, 2020, also provide additional information that may be useful concerning the concentration of the upconverting nanoparticles and the concentrations of the sensitizer and annihilator in the photohardenable composition.

As mentioned above, a photohardenable composition in accordance with the present invention can optionally further include one or more additives. Examples of additives include, but are not limited to, thixotropes, light blockers, defoamers, oxygen scavengers, and non-reactive solvent diluents. Additional information concerning examples of certain additives follows.

A photohardenable composition in accordance with the present invention can further include a thixotrope. Inclusion of a thixotrope can advantageously facilitate forming an article, such as a three-dimensional object in the case of 3D printing, without the need for support structures employed in conventional layer-by-layer three-dimensional or additive manufacturing processes to provide mechanical support to the object being fabricated where, for example, a region of the object is not fully supported by previously formed layers. Avoiding the use of support structures also avoids the step of removing support structures from the object after printing which can lead to surface deformations or other flaws in the object being formed.

It can be desirable for an article comprising a three-dimensional object to be fully suspended in the volume of the photohardenable composition during formation thereof.

Inclusion of a thixotrope in a photohardenable composition can further facilitate forming a three-dimensional object at a selected position in a volume of the photohardenable composition with a minimal displacement of the object in the volume of photohardenable composition during formation. Preferably the minimal displacement is an amount of movement that is acceptable for precisely producing the intended object geometry during the time interval required to form the object. Most preferably, the position of the object in the volume of the photohardenable composition remains fixed position during formation of the object.

Thixotropes suitable for inclusion in the photohardenable compositions include, for example and without limitation, urea derivatives; modified urea compounds such as Rheobyk 410 and Rheobyk-D 410 available from BYK-Chemie GmbH, part of the ALTANA Group; fumed metal oxides (also referred to as pyrogenic metal oxides) including for example, but not limited to, fumed silica, fumed alumina; zirconia; precipitated metal oxides including for example, but not limited to, precipitated silica, precipitated alumina; unmodified and organo-modified phyllosilicate clays; dimer and trimer fatty acids; polyether phosphates; oxidized polyolefins; hybrid oxidized polyolefins with polyamide; alkali soluble/swellable emulsions; cellulosic ethers; hydrophobically-modified alkali soluble emulsions; hydrophobically-modified ethylene oxide-based urethane; sucrose benzoate; ester terminated polyamides; tertiary amide terminated polyamides; polyalkyleneoxy terminated polyamides; polyether amides; acrylamidomethyl-substituted cellulose ester polymers; polyethyleneimine; polyurea; organoclays; hydrogenated castor oil; organic base salts of a clay mineral (e.g., montmorillonite) and other silicate-type materials; aluminum, calcium, and zinc salts of fatty acids, such as lauric or stearic acid.

See U.S. Pat. Nos. 6,548,593 of Merz, et al., issued Apr. 15, 2003, and 9,376,602 of Walther, et al. issued Jun. 28, 2016, which are hereby incorporated herein by reference in their entireties, for information relating to urea derivatives that may be useful as thixotropes.

Thermally reversible gellants such as ester terminated polyamides, tertiary amide terminated polyamides, polyalkyleneoxy terminated polyamides, and polyether amides, and combinations thereof, may be desirable for us as thixotropes. Examples include Crystasense LP1, Crystasense LP2, Crystasense LP3, Crystasense MP, Crystasense HP4, Crystasense HP5, Rheoptima X17, Rheoptima X24, Rheoptima X38, Rheoptima X58, Rheoptima X73, and Rheoptima X84 available from Croda.

Metal oxides that have been surface-treated to impart dispersibility characteristics compatible with the hardenable resin component may be desirable for use as thixotropes.

A thixotrope can be included in the photohardenable composition in an amount, for example, but not limited to, in a range from about 0.1 weight percent to about 15 weight percent of the photohardenable composition.

A thixotrope is preferably included in the photohardenable composition in an amount effective to at least partially restrict movement of the three-dimensional object or one or more regions thereof in the photohardenable composition during formation.

When it is desired to print an article or portion thereof that is suspended in a volume of a photohardenable composition during formation (e.g., not in contact with a surface of the build region or container in which the volume is contained), a thixotrope is preferably included in the composition in an amount effective to at least partially restrict movement of the suspended three-dimensional object in the volume of photohardenable composition during formation. More preferably the position of the object in the volume of the photohardenable composition remains fixed during formation.

A photohardenable composition in accordance with the present invention can further include a light blocker to control the spread of upconverted light and improve the selectivity and resolution of hardening. Preferably a light blocker has an absorption wavelength range that overlaps at least partially with the absorption wavelength range of the photoinitiator and the emission wavelength range of the radiation or light used to activate the photoinitiator. Examples of preferred light blockers include azo dyes such as Sudan 1, Sudan 3, and other light blockers that can be readily identified by one of ordinary skill in the relevant art.

A photohardenable composition in accordance with the present invention can further include a defoamer to aid in removing bubbles introduced during processing and handling. A preferred defoamer is BYK 1798 (a silicone based defoamer) available from BYK-Chemie GmbH, part of the ALTANA Group.

A photohardenable composition in accordance with the present invention can further include an oxygen scavenger to react with oxygen (e.g., singlet oxygen, dissolved oxygen) present in the photohardenable composition. WO 2019/025717 A1 of Baldeck, et al., published Feb. 7, 2019 provides information that may be useful regarding antioxidant additives.

A photohardenable composition in accordance with the present invention can further include a non-reactive solvent diluent. Examples include, but are not limited to, acetone, amyl acetate, n-butanol, sec-butanol, tert-butanol, butyl acetate, cyclohexanone, decane, dimethylacetamide, dimethylformamide, dimethylsulfoxide, dipropylene glycol, dipropylene glycol methyl ether, ethanol, ethyl acetate, ethylene glycol, glycerol, heptane, isopropanol, isopropyl acetate, methyl ethyl ketone, N-methyl pyrrolidone, propylene carbonate, propylene glycol, propylene glycol diacetate, tetrahydrofuran, tripropylene glygol methyl ether, toluene, water, xylenes.

In accordance with still another aspect of the invention, there is provided a method of forming an article, the method comprising: (a) providing a photohardenable composition comprising: (i) a hardenable resin component; (ii) a photoinitiator configured to create reactive species for initiating hardening of the photohardenable composition when activated by radiation; and (iii) a stabilizer comprising a stable free radical-functionalized polymer; (b) irradiating one or more selected locations in the photohardenable composition with radiation including one or more wavelengths for activating the photoinitiator to initiate hardening of the photohardenable composition at the one or more selected locations within the photohardenable composition; and (c) optionally repeating step (b) at one or more of the same or different selected locations within the photohardenable composition until at least a portion of the article is formed.

In accordance with still another aspect of the invention, there is provided a method for spatially limiting photohardening of a photohardenable composition during formation of an article, the method comprising (a) providing a photohardenable composition comprising (i) a hardenable resin component; (ii) a photoinitiator configured to create reactive species for initiating hardening of the photohardenable composition when activated by radiation; and (iii) a stabilizer comprising a stable free radical-functionalized polymer; (b) irradiating one or more selected locations in the photohardenable composition with radiation to initiate hardening of the photohardenable composition at the one or more selected locations within the photohardenable composition; and (c) optionally repeating step (b) at one or more of the same or different selected locations within the photohardenable composition until at least a portion of the article is formed.

The photohardenable composition can be included in a container or build region that includes at least a portion that is optically transparent so that the photohardenable composition is accessible by radiation or excitation light.

In certain embodiments, the container or build region includes a volume of photohardenable composition and an article is formed in the volume.

Radiation including one or more wavelengths to initiate hardening of the photohardenable composition is preferably configured for activating the photoinitiator (e.g., via absorption by the photoinitiator).

Radiation is preferably selectively directed to one or more selected locations in the photohardenable composition to initiate hardening of the photohardenable composition at the one or more selected locations.

In methods of the present invention that do not include an upconverting component, the radiation or excitation source is preferably selected to emit a radiation including one or more wavelengths or within one or more ranges of wavelengths for activating the photoinitiator (e.g., but not limited to, by absorption of the activating wavelength(s) by the photoinitiator) to initiate hardening of the photohardenable composition.

In accordance with yet another aspect of the invention, there is provided a method of forming an article, the method comprising: (a) providing a volume of a photohardenable composition comprising: (i) a hardenable resin component; (ii) a photoinitiator configured to create reactive species for initiating hardening of the photohardenable composition when activated by radiation; (iii) an upconverting component configured to upconvert excitation light at one or more wavelengths in a first range of wavelengths to upconverted light including one or more wavelengths in a second range of wavelengths, wherein the upconverted light includes radiation including one more wavelengths for activating the photoinitiator; and (iv) a stabilizer comprising a stable free radical-functionalized polymer; (b) directing excitation light at one or more wavelengths in the first range of wavelengths into the volume of the photohardenable composition for upconversion by the upconverting component and initiating local hardening of the photohardenable composition at one or more selected locations within the volume of the photohardenable composition; and (c) optionally repeating step (b) at the same or a different selected location within the volume of the photohardenable composition until at least a portion of the article is formed.

In accordance with yet another aspect of the invention, there is provided a method of forming an article, the method comprising: (a) providing a volume of a photohardenable composition comprising (i) a hardenable resin component; (ii) a photoinitiator configured to create reactive species for initiating hardening of the photohardenable composition when activated by radiation; (iii) an upconverting component configured to upconvert excitation light at one or more wavelengths in a first range of wavelengths to upconverted light including one or more wavelengths in a second range of wavelengths, wherein the upconverted light includes radiation including one or more wavelengths configured to activate the photoinitiator; and (iv) a stabilizer comprising a stable free radical-functionalized polymer; (b) irradiating one or more selected locations in the photohardenable composition with excitation light at one or more wavelengths in the first range of wavelengths for upconversion by the upconverting component and initiating local hardening of the photohardenable composition at the one or more selected locations in the photohardenable composition; and (c) optionally repeating step (b) at one or more of the same or a different selected locations within the volume of the photohardenable composition until at least a portion of the article is formed.

In accordance with still yet another aspect of the invention, there is provided a method for spatially limiting photohardening of a photohardenable composition during formation of an article, the method comprising: (a) providing a volume of a photohardenable composition comprising (i) a hardenable resin component; (ii) a photoinitiator configured to create reactive species for initiating hardening of the photohardenable composition when activated by radiation; (iii) an upconverting component configured to upconvert excitation light at one or more wavelengths in a first range of wavelengths to upconverted light including one or more wavelengths in a second range of wavelengths, wherein the upconverted light includes radiation including one more wavelengths for activating the photoinitiator; and (iv) a stabilizer comprising a stable free radical-functionalized polymer; (b) directing excitation light at one or more wavelengths in the first range of wavelengths into the volume of the photohardenable composition for upconversion by the upconverting component and initiating local hardening of the photohardenable composition at one or more selected locations within the volume of the photohardenable composition; and (c) optionally repeating step (b) at one or more of the same or a different selected location within the volume of the photohardenable composition until at least a portion of the article is formed.

In methods of the present invention that include an upconverting component, suitable wavelengths for a first range of wavelengths includes, but is not limited to, from about 400 to about 800 nm. Preferably the first range of wavelengths is from about 605 nm to about 650 nm, from about 520 to about 540 nm, from about 425 to about 460 nm, from about 680 nm to about 740 nm.

In methods of the present invention that include an upconverting component, suitable wavelengths for upconverted light in a second range of wavelengths can be from about 300 nm to about 600 nm. Preferably the second range of wavelength is from about 400 nm to about 500 nm, from about 360 nm to about 420 nm, about 420 nm to about 480 nm, from about 440 to about 460 nm, from about 440 nm to about 510 nm, from about 460 nm to about 530 nm.

By way of example, without limitation, in methods of the present invention that include an upconverting component, excitation light at one or more wavelengths in a range of 638 nm plus or minus 10 nm can be useful to produce upconverted light in a range from about 390 nm to about 500 nm.

By way of another example, without limitation, in methods of the present invention that include an upconverting component, excitation light at one or more wavelengths in a range of 532 nm plus or minus 10 nm can be useful to produce upconverted light in a range from about 390 nm to about 500 nm.

Excitation light can be directed into the volume as an optical projection of excitation light. The excitation light or optical projection of excitation light can be directed to one or more selected locations in the volume to selectively initiate photohardening of the photohardenable composition at such one or more selected locations.

In the methods described herein, excitation light or radiation may be applied using any suitable light or electromagnetic radiation source or optical projection system (which typically includes a light or electromagnetic radiation source). Examples of light or electromagnetic radiation light sources include, but are not limited to, lasers (including laser diodes) and other coherent light sources, light-emitting diodes (LEDs), micro-LED arrays, vertical cavity lasers (VCLs), and filtered lamps. Such light sources are commercially available and selection of a suitable light source can be readily made by one of ordinary skill in the relevant art. LEDs of the type such as Phlatlight LEDs available from Luminus for use with DMDs may also be suitable.

Optionally, the excitation light can be temporally and/or spatially modulated. Optionally, the intensity of the excitation light can be modulated by known or readily ascertainable techniques. Optionally, source drive modulation by known or readily ascertainable techniques can be used to adjust the absolute power of the light beam.

Excitation light can be applied as an image. Examples of images include, without limitation, a line of light, a single beam of light, a two-dimensional image, a patterned image, a patterned two-dimensional image. An image can comprise a cross-sectional plane of the three-dimensional image or article being printed.

Spatially modulated excitation light can be used to direct or irradiate a patterned image or a two-dimensional image at one or more selected locations in the photohardenable composition.

For example, spatially modulated excitation light can be created by an optical projection system including a spatial modulation component (also referred to herein as a spatial light modulator ("SLM")). Examples of spatial modulation components for inclusion in an optical projection system include, for example and without limitation, a liquid crystal display (also referred to herein as "LCD"), a digital micromirror device (also referred to herein as "DMD")), a micro-LED array, a vertical cavity laser (also referred to herein as "VCL" or as a Vertical Cavity Surface Emitting Laser (also referred to herein as "VCSEL"), a scanning laser system, a liquid crystal on silicon (also referred to herein as "LCoS") microdisplay.

An optical projection system comprising a spatial light modulator may be utilized with incoherent light as an amplitude modulator in combination with projection lens to form images in the photopolymerizable liquid for amplitude base projections.

Optionally, an optical projection system comprising a spatial light modulator may be utilized as a wavefront encoding device to form a phase or complex amplitude modulation on the wavefront in a holographic configuration.

An optical projection system can be selected to apply continuous excitation light. An optical system can be selected to apply intermittent excitation light. Intermittent excitation can include random on and off application of light or periodic application of light. Examples of periodic application of light includes pulsing. An optical system can be selected to apply a combination of both continuous excitation light and intermittent light, including, for example, an irradiation step that includes the application of intermittent excitation light that is preceded or followed by irradiation with continuous light.

The methods described herein can further comprise repeating the step of irradiating or directing excitation light into the volume of the photohardenable composition at one or more of the same, additional, and/or different selected locations within the volume until the desired article or object is partially or fully formed.

An optical projection system can further include projection optics and/or additional components including, but not limited to, one or more translational stages for moving the system or components thereof.

The method disclosed herein can also include the use commercially available projection and filtering techniques that can assist in providing a very narrow depth of focus or systems that employ two or more optical projection methods at once.

A preferred optical projection system can include a light source, projection optics, and a spatial modulation component.

In methods described herein, power densities or intensities of excitation light or radiation directed into the volume of photohardenable composition to initiate or cause hardening (e.g., by polymerization, cross-linking) to occur at the one or more selected locations may be, without limitation, less than 5000 $W/cm^2$, less than 1000 $W/cm^2$, less than 500 $W/cm^2$, less than 100 $W/cm^2$, less than 50 $W/cm^2$, less than 10 $W/cm^2$, less than 5 $W/cm^2$, less than 1 $W/cm^2$, less than 500 $mW/cm^2$, less than 100 $mW/cm^2$, less than 50 $mW/cm^2$, less than 10 $mW/cm^2$, less than 1 $mW/cm^2$, etc. Other power densities or intensities may also be determined to be useful.

A photohardenable composition in accordance with various aspects and embodiments of the present invention may be included or contained within any build region or container which may define a print volume in some cases. Light may penetrate to at least various depths within the non-hardened or liquid composition. Preferably the non-hardened composition is optically transparent. Preferably the container or build region includes at least a portion that is optically transparent so that the photohardenable composition is accessible to radiation or excitation light. In some embodiments, the light or other electromagnetic radiation may be focused onto one or more specific locations or regions within the print volume.

As noted above, the upconverting component may have a quadratic dependence on fluence, allowing initiation of hardening of the photohardenable composition at a focal point or region of the light within the print volume, e.g., without causing polymerization in other regions within the print volume, due to the quadratic dependence. In some cases, due to this quadratic dependence, relatively low light intensities can be used to initiate hardening at a focal point or region. For instance, the intensity or power density of the applied electromagnetic radiation applied to the focal point or region to initiate photohardening of the photohardenable composition may be less than 5,000 $W/cm^2$, less than 3,000 $W/cm^2$, less than 2,000 $W/cm^2$, less than 1,000 $W/cm^2$, less than 500 $W/cm^2$, less than 300 $W/cm^2$, less than 200 $W/cm^2$, less than 100 $W/cm^2$, less than 50 $W/cm^2$, less than 30 $W/cm^2$, less than 20 $W/cm^2$, less than 10 $W/cm^2$, less than 5 $W/cm^2$, less than 3 $W/cm^2$, less than 2 $W/cm^2$, less than 1 $W/cm^2$, less than 500 $mW/cm^2$, less than 300 $mW/cm^2$, less than 200 $mW/cm^2$, less than 100 $mW/cm^2$, etc. Most preferably, a quadratic relationship exists between the fluence or power of the excitation light and emission from the upconverting component in the photohardenable composition. When the radiation upconversion has a quadratic intensity dependence, local hardening of the photohardenable composition can be initiated preferentially at more intensely illuminated locations within the volume of the photohardenable composition.

A method of the present invention can include providing a volume of a photohardenable composition included within a build region or container wherein at least a portion of the container is optically transparent so that the photohardenable composition is accessible by excitation light. Preferably, the entire container is optically transparent.

Optically transparent portions of a container can be constructed from a material comprising, for example, but not limited to, glass, quartz, fluoropolymers (e.g., Teflon FEP, Teflon AF, Teflon PFA), cyclic olefin copolymers, polymethyl methacrylate (PMMA), polynorbornene, sapphire, or transparent ceramic.

Examples of container shapes include, but are not limited to, a cylindrical container having a circular or oval cross-section, a container having straight sides with a polygonal cross-section or a rectangular or square cross-section.

Preferably the optically transparent portion(s) of the container is (are) also optically flat.

Optionally, one or more filters are added to at least a surface of any optically transparent portions of the container to block undesired light, e.g., with a wavelength the same as the upconverted light (e.g., light in the second range of wavelengths), to prevent unintentional curing.

In methods of the present invention that include an upconverting component, the photohardenable composition is preferably degassed, purged or sparged with an inert gas before or after being introduced into the container and is maintained under inert conditions, e.g., under an inert atmosphere, while in the container which is preferably closed during printing. This can prevent introduction of oxygen into the container while the three-dimensional object is being printed or formed. Preferably the container is sealed or otherwise closed in an air-tight manner to prevent introduction of oxygen into the container during printing. The seal or other closing techniques that may be used should not be permanent so at least that the printed objects and unpolymerized material can be removed from the container.

Degassing, purging or sparging of the photohardenable composition and/or sealing or closing techniques of the container may also be useful or desirable with methods of the invention not including an upconverting component taking into consideration oxygen sensitivity of the photohardenable composition.

In certain instances, depending, for example, upon the materials used, the photohardenable composition is preferably substantially oxygen free (e.g., less than 50 ppm oxygen) during printing.

In the methods described herein, the container optionally may be rotated to provide additional angles of illumination or projection of excitation light into the volume of photohardenable composition contained therein. This can be of assistance in patterning object volumes or surfaces more accurately or it can be used as a means of providing multiple exposure of a given feature from different angles.

In the method described herein, the container optionally may be stationary while a beam or optical projection of excitation light is being directed into the photohardenable composition.

Before printing, a digital file of the article or object to be printed is typically obtained. If the digital file is not of a format that can be used to print the object, the digital file is then converted to a format that can be used to print the object. An example of a typical format that can be used for printing includes, but is not limited to, an STL file. Typically, the STL file is then sliced into two-dimensional layers with use of three-dimensional slicer software and converted into G-Code or a set of machine commands, which facilitates building the object. See B. Redwood, et al., "The 3D Printing Handbook—Technologies, designs applications", 3D HUBS B.V. 2018.

The methods of the present invention can further include post-treatment of the three-dimensional object(s) formed.

Examples of post-treatments include, but are not limited to, washing, post-curing (e.g., by light, e-beam, heat, non-ionizing radiation, ionizing radiation, pressure, humidity, or simultaneous or sequential combinations of techniques), metrology, freeze-dry processing, critical point drying, and packaging.

Other information concerning optical systems that may useful in connection with the various aspects of the present invention includes Texas Instruments Application Report DLPA022-July 2010 entitled "DLP™ System Optics"; Texas Instruments "TI DL R Technology for 3D Printing—Design scalable high-speed stereolithography [sic] systems using TI DLP technology" 2016; Texas Instruments "DLP6500 0.65 1018p MVSP Type A DMD", DLP6500, DLPS040A-October 2014—Revised October 2016; and Y-H Lee, et al., "Fabrication of Periodic 3D Nanostructuration for Optical Surfaces by Holographic Two-Photon-Polymerization", Int'l Journal of Information and Electronics Engineering, Vol 6, No. 3, May 2016, each of the foregoing being hereby incorporated herein by reference in its entirety.

When used as a characteristic of a portion of a container or build chamber, "optically transparent" refers to having high optical transmission to the wavelength of light being used, and "optically flat" refers to being non-distorting (e.g., optical wavefronts entering the portion of the container or build chamber remain largely unaffected).

Embodiments of inventions described herein including the following:

Embodiment 1 is a photohardenable composition, preferably for use in three-dimensional printing. The photohardenable composition comprises: (i) a hardenable resin component; (ii) a photoinitiator configured to create reactive species for initiating hardening of the photohardenable composition, preferably by free radical reactions, when activated by radiation; and (iii) a stabilizer comprising a stable free radical-functionalized polymer.

Embodiment 2 is the photohardenable composition of embodiment 1 wherein the stable free radical-functionalized polymer comprises one or more stable free radicals.

Embodiment 3 is the photohardenable composition of embodiment 1 wherein a stable free radical moiety comprises a nitroxide free radical.

Embodiment 4 is the photohardenable composition of embodiment 1 wherein a stable free radical moiety comprises 2,2,6,6-tetramethyl-1-piperidinyloxy or a derivative thereof.

Embodiment 5 is the photohardenable composition of embodiment 1 wherein a stable free radical moiety comprises 2,2,5,5-tetramethyl-1-pyrrolidinyloxy or a derivative thereof.

Embodiment 6 is the photohardenable composition of embodiment 1 wherein a stable free radical moiety comprises 4,4-dimethyl-3-oxazolidinyloxy or a derivative thereof.

Embodiment 7 is the photohardenable composition of embodiment 1 wherein a stable free radical moiety comprises tris(4-bromophenyl)ammoniumyl hexachloroantimonate.

Embodiment 8 is the photohardenable composition of embodiment 1 wherein the stable free radical-functionalized polymer comprises a polymer including one or more types of monomer units in any sequence.

Embodiment 9 is the photohardenable composition of embodiment 1 wherein the stable free radical-functionalized polymer comprises a homopolymer.

Embodiment 10 is the photohardenable composition of embodiment 1 wherein the stable free radical-functionalized polymer comprises a random copolymer, Embodiment 11 is the photohardenable composition of embodiment 1 wherein the stable free radical-functionalized polymer comprises an alternating copolymer.

Embodiment 12 is the photohardenable composition of embodiment 1 wherein the stable free radical-functionalized polymer comprises a gradient copolymer.

Embodiment 13 is the photohardenable composition of embodiment 1 wherein the stable free radical-functionalized polymer comprises a block copolymer.

Embodiment 14 is the photohardenable composition of embodiment 1 wherein the stable free radical-functionalized polymer comprises a combination including one or more polymers or copolymers.

Embodiment 15 is the photohardenable composition of embodiment 1 wherein the stable free radical-functionalized polymer comprises a polymer with a molecular weight of 200 g/mol or higher.

Embodiment 16 is the photohardenable composition of embodiment 1 wherein the stable free radical-functionalized polymer has a lower molecular diffusivity in the photohardenable composition than a molecule of the same stable free radical not attached to a polymer.

Embodiment 17 is the photohardenable composition of embodiment 1 wherein the hardenable resin component comprises a monomer.

Embodiment 18 is the photohardenable composition of embodiment 1 wherein the hardenable resin component comprises an oligomer.

Embodiment 19 is the photohardenable composition of embodiment 1 wherein the hardenable resin component comprises a pre-polymer.

Embodiment 20 is the photohardenable composition of embodiment 1 wherein the hardenable resin component comprises a polymer.

Embodiment 21 is the photohardenable composition of embodiment 1 wherein the hardenable resin component comprises a mixture including at least one hardenable resin component.

Embodiment 22 is the photohardenable composition of embodiment 1 wherein the hardenable resin component comprises an ethylenically-unsaturated species.

Embodiment 23 is the photohardenable composition of embodiment 1 wherein the hardenable resin component comprises an epoxide species.

Embodiment 24 is the photohardenable composition of embodiment 1 wherein the hardenable resin component comprises a free radical polymerizable resin.

Embodiment 25 is the photohardenable composition of embodiment 1 wherein the hardenable resin component comprises a cross-linkable resin.

Embodiment 26 is the photohardenable composition of embodiment 1 wherein the hardenable resin component comprises one or more multifunctional acrylate monomers.

Embodiment 27 is the photohardenable composition of embodiment 1 wherein the hardenable resin component comprises a methacrylate.

Embodiment 28 is the photohardenable composition of embodiment 1 wherein the hardenable resin component comprises an aliphatic urethane acrylate.

Embodiment 29 is the photohardenable composition of embodiment 1 wherein the hardenable resin component comprises an aliphatic urethane acrylate monomer and a multifunctional acrylate monomer.

Embodiment 30 is the photohardenable composition of embodiment 1 wherein the hardenable resin component comprises an acrylamide monomer.

Embodiment 31 is the photohardenable composition of embodiment 1 wherein the photohardenable composition exhibits non-Newtonian fluid or non-Newtonian rheological behavior.

Embodiment 32 is the photohardenable composition of embodiment 1 further comprising a thixotrope.

Embodiment 33 is the photohardenable composition of embodiment 1 further comprising a defoamer.

Embodiment 34 is the photohardenable composition of embodiment 1 further comprising a light blocker.

Embodiment 35 is the photohardenable composition of embodiment 1 wherein the hardenable resin component comprises a free radical polymerizable or free-radical-cross-linkable component and the photoinitiator initiates polymerization or cross-linking of the hardenable resin component by free radical reactions.

Embodiment 36 is the photohardenable composition of embodiment 1 wherein the photoinitiator initiates polymerization or cross-linking of the hardenable resin component by free radical reactions.

Embodiment 37 is a further embodiment of a photohardenable composition. This embodiment of a photohardenable composition comprises: (i) a hardenable resin component; (ii) a photoinitiator configured to create reactive species for initiating hardening of the photohardenable composition by free radical reactions when activated by radiation; (iii) an upconverting component configured to upconvert excitation light at one or more wavelengths in a first range of wavelengths to upconverted light including one or more wavelengths in a second range of wavelengths, wherein the upconverted light includes radiation at one or more wavelengths configured to activate the photoinitiator; and (iv) a stabilizer comprising a stable free radical-functionalized polymer.

Embodiment 38 is the photohardenable composition of embodiment 37 wherein the stable free radical-functionalized polymer comprises one or more stable free radicals.

Embodiment 39 is the photohardenable composition of embodiment 37 wherein a stable free radical moiety comprises a nitroxide free radical.

Embodiment 40 is the photohardenable composition of embodiment 37 wherein a stable free moiety comprises 2,2,6,6-tetramethyl-1-piperidinyloxy or a derivative thereof.

Embodiment 41 is the photohardenable composition of embodiment 37 wherein a stable free radical moiety comprises 2,2,5,5-tetramethyl-1-pyrrolidinyloxy or a derivative thereof.

Embodiment 42 is the photohardenable composition of embodiment 37 wherein a stable free radical moiety comprises 4,4-dimethyl-3-oxazolidinyloxy or a derivative thereof.

Embodiment 43 is the photohardenable composition of embodiment 37 wherein a stable free radical moiety comprises tris(4-bromophenyl)ammoniumyl hexachloroantimonate.

Embodiment 44 is the photohardenable composition of embodiment 37 wherein the stable free radical-functionalized polymer comprises one or more types of monomer units in any sequence.

Embodiment 45 is the photohardenable composition of embodiment 37 wherein the stable free radical-functionalized polymer comprises a homopolymer.

Embodiment 46 is the photohardenable composition of embodiment 37 wherein the stable free radical-functionalized polymer comprises a random copolymer.

Embodiment 47 is the photohardenable composition of embodiment 37 wherein the stable free radical-functionalized polymer comprises an alternating copolymer.

Embodiment 48 is the photohardenable composition of embodiment 37 wherein the stable free radical-functionalized polymer comprises a gradient copolymer.

Embodiment 49 is the photohardenable composition of embodiment 37 wherein the stable free radical-functionalized polymer comprises a block copolymer.

Embodiment 50 is the photohardenable composition of embodiment 37 wherein the stable free radical-functionalized polymer comprises a combination including one or more polymers or copolymers.

Embodiment 51 is the photohardenable composition of embodiment 37 wherein the stable free radical-functionalized polymer comprises a polymer with a molecular weight of 200 g/mol or higher.

Embodiment 52 is the photohardenable composition of embodiment 37 wherein the stable free radical-functionalized polymer has a lower molecular diffusivity in the photohardenable composition than a molecule of the same stable free radical not attached to a polymer.

Embodiment 53 is the photohardenable composition of embodiment 37 wherein the hardenable resin component comprises a monomer.

Embodiment 54 is the photohardenable composition of embodiment 37 wherein the hardenable resin component comprises an oligomer.

Embodiment 55 is the photohardenable composition of embodiment 37 wherein the hardenable resin component comprises a pre-polymer.

Embodiment 56 is the photohardenable composition of embodiment 37 wherein the hardenable resin component comprises a polymer.

Embodiment 57 is the photohardenable composition of embodiment 37 wherein the hardenable resin component comprises a mixture including at least one hardenable resin component.

Embodiment 58 is the photohardenable composition of embodiment 37 wherein the hardenable resin component comprises an ethylenically-unsaturated species.

Embodiment 59 is the photohardenable composition of embodiment 37 wherein the hardenable resin component comprises an epoxide species.

Embodiment 60 is the photohardenable composition of embodiment 37 wherein the hardenable resin component comprises a free radical polymerizable resin.

Embodiment 61 is the photohardenable composition of embodiment 37 wherein the hardenable resin component comprises a cross-linkable resin.

Embodiment 62 is the photohardenable composition of embodiment 37 wherein the hardenable resin component comprises one or more multifunctional acrylate monomers.

Embodiment 63 is the photohardenable composition of embodiment 37 wherein the hardenable resin component comprises a methacrylate.

Embodiment 64 is the photohardenable composition of embodiment 37 wherein the hardenable resin component comprises an aliphatic urethane acrylate.

Embodiment 65 is the photohardenable composition of embodiment 37 wherein the hardenable resin component comprises an aliphatic urethane acrylate monomer and a multifunctional acrylate monomer.

Embodiment 66 is the photohardenable composition of embodiment 37 wherein the hardenable resin component comprises an acrylamide monomer.

Embodiment 67 is the photohardenable composition of embodiment 37 wherein the photohardenable composition exhibits non-Newtonian fluid or non-Newtonian rheological behavior.

Embodiment 68 is the photohardenable composition of embodiment 37 further comprising a thixotrope.

Embodiment 69 is the photohardenable composition of embodiment 37 further comprising a defoamer.

Embodiment 70 is the photohardenable composition of embodiment 37 further comprising a light blocker.

Embodiment 71 is the photohardenable composition of embodiment 37 wherein the hardenable resin component comprises a free radical polymerizable or free-radical-cross-linkable component and the photoinitiator initiates polymerization or cross-linking of the hardenable resin component by free radical reactions.

Embodiment 72 is the photohardenable composition of embodiment 37 wherein the photoinitiator initiates polymerization or cross-linking of the hardenable resin component by free radical reactions.

Embodiment 73 is the photohardenable composition of embodiment of any one of embodiments 37-72 wherein the upconverting component comprises a sensitizer and an annihilator, the sensitizer being selected to absorb excitation light at one or more wavelengths in the first range of wavelengths and the annihilator being selected to emit light at one or more wavelengths in the second range of wavelengths after transfer of energy from the sensitizer to the annihilator.

Embodiment 74 is the photohardenable composition of embodiment 73 wherein the upconverting component comprises upconverting nanoparticles for absorbing light at one or more wavelengths in a first range of wavelengths and emitting light at one or more wavelengths in a second range of wavelengths.

Embodiment 75 is the photohardenable composition of embodiment 73 wherein the upconverting component comprises upconverting nanoparticles including a sensitizer and an annihilator, the sensitizer being selected to absorb excitation light at one or more wavelengths in a first range of wavelengths and the annihilator being selected to emit light at one or more wavelengths in a second range of wavelengths after transfer of energy from the sensitizer to the annihilator.

Embodiment 76 is the photohardenable composition of embodiment 75 wherein at least a portion of the upconverting nanoparticles include a core including the sensitizer and annihilator in a medium and an encapsulating shell over at least a portion, and preferably substantially all, of an outer surface of the core portion.

Embodiment 77 is the photohardenable composition of embodiment 76 wherein at least a portion of the cores comprise a micelle including the sensitizer and the annihilator in the medium.

Embodiment 78 is the photohardenable composition of embodiment 76 wherein the medium comprises a liquid.

Embodiment 79 is the photohardenable composition of embodiment 76 wherein the medium comprises carboxylic acid.

Embodiment 80 is the photohardenable composition of embodiment 78 wherein the liquid comprises carboxylic acid.

Embodiment 81 is the photohardenable composition of embodiment 73 wherein the sensitizer comprises a substituted or unsubstituted porphyrin or derivative thereof, a substituted or unsubstituted metalloporphyrin or derivative thereof, or a mixture including any one or more of the foregoing.

Embodiment 82 is the photohardenable composition of embodiment 75 wherein the sensitizer comprises a substituted or unsubstituted porphyrin or derivative thereof, a substituted or unsubstituted metalloporphyrin or derivative thereof, or a mixture including any one or more of the foregoing.

Embodiment 83 is the photohardenable composition of embodiment 73 wherein the annihilator comprises a substituted or unsubstituted anthracene or derivative thereof, or a mixture including any one or more of the foregoing.

Embodiment 84 is the photohardenable composition of embodiment 75 wherein the annihilator comprises a substituted or unsubstituted anthracene or derivative thereof, or a mixture including any one or more of the foregoing.

Embodiment 85 is the photohardenable composition of embodiment 76 wherein the shell comprises a metal oxide.

Embodiment 86 is the photohardenable composition of embodiment 76 wherein the shell comprises silica.

Embodiment 87 is the photohardenable composition of embodiment 76 wherein the nanoparticles further include functional groups at the outer surface thereof.

Embodiment 88 is the photohardenable composition of embodiment 73 wherein the annihilator comprises molecules capable of receiving a triplet exciton from a molecule of the sensitizer through triplet-triplet energy transfer, undergo triplet fusion with another annihilator molecule triplet to generate a higher energy singlet that emits light in the second range of wavelengths.

Embodiment 89 is the photohardenable composition of embodiment 75 wherein the annihilator comprises molecules capable of receiving a triplet exciton from a molecule of the sensitizer through triplet-triplet energy transfer, undergo triplet fusion with another annihilator molecule triplet to generate a higher energy singlet that emits light in the second range of wavelengths.

Embodiment 90 is the photohardenable composition of embodiment 37 further comprising a light blocker having an absorption wavelength range that overlaps at least partially with the absorption wavelength range of the photoinitiator and the emission wavelength range of the upconverted light.

Embodiment 91 is the photohardenable composition of embodiment 37 wherein the photoinitiator is activated by upconverted light generated by the upconverting component in the second range of wavelengths and not activated by excitation light in the first range of wavelengths.

Embodiment 92 is the photohardenable composition of embodiment 37 wherein the first range of wavelengths is from about 400 nm to about 800 nm.

Embodiment 93 is the photohardenable composition of embodiment 37 wherein the second range of wavelengths is from about 360 to about 530 nm.

Embodiment 94 is the photohardenable composition of embodiment 37 wherein the second range of wavelengths is from about 360 nm to about 420 nm.

Embodiment 95 is the photohardenable composition of embodiment 37 wherein the second range of wavelengths is from about 420 to about 480.

Embodiment 96 is a method of forming an article. The method comprising: (a) providing a volume of the photohardenable composition of any one of embodiments 1-36; (b) irradiating one or more selected locations in the photohardenable composition with radiation including one or more wavelengths for activating the photoinitiator to initiate hardening of the photohardenable composition at the one or more selected locations within the photohardenable composition; and (c) optionally repeating step (b) at one or more of the same or different selected locations within the photohardenable composition until at least a portion of the article is formed.

Embodiment 97 is the method of embodiment 96 wherein the radiation has an intensity so that local hardening of the photohardenable composition is initiated at the one or more selected locations within the volume of the photohardenable composition.

Embodiment 98 is a further method of forming an article. This method comprises: (a) providing a volume of the photohardenable composition of any one of embodiments 37-95; (b) irradiating one or more selected locations in the photohardenable composition with excitation light at one or more wavelengths in the first range of wavelengths for upconversion by the upconverting component and initiating local hardening of the photohardenable composition at the one or more selected locations in the photohardenable composition; and (c) optionally repeating step (b) at one or more of the same or a different selected locations within the volume of the photohardenable composition until at least a portion of the article is formed.

Embodiment 99 is yet a further method of forming an article. This method comprises: (a) providing a volume of the photohardenable composition of any one of embodiments 37-95; (b) directing excitation light at one or more wavelengths in the first range of wavelengths into the volume of the photohardenable composition for upconversion by the upconverting component to one or more wavelengths in a second range of wavelengths and initiating local hardening of the photohardenable composition at one or more selected locations within the volume of the photohardenable composition; and (c) optionally repeating step (b) at the same or a different selected location within the volume of the photohardenable composition until at least a portion of the article is formed.

Embodiment 100 is the method of any one of embodiments 96-99 wherein the volume of the photohardenable composition is included within a container wherein at least a portion of the container is optically transparent so that the photohardenable composition is accessible by excitation light.

Embodiment 101 is the method of embodiment 98 or 99 wherein the excitation light has an excitation intensity so that local hardening of the photohardenable composition by the upconverted light is initiated at the one or more selected locations within the volume of the photohardenable composition.

Embodiment 102 is the method of embodiment 96, 98, or 99 wherein the photohardenable composition has a steady shear viscosity less than 30,000 centipoise.

Embodiment 103 is the method of embodiment 96, 98, or 99 wherein the photohardenable composition has a steady shear viscosity less than 10,000 centipoise.

Embodiment 104 is the method of embodiment 96, 98, or 99 wherein the photohardenable composition has a steady shear viscosity less than 1,000 centipoise.

Embodiment 105 is the method of embodiment 96, 98, or 99 wherein the radiation or excitation light has a power density less than 1000 $W/cm^2$ at the one or more selected locations.

Embodiment 106 is the method of embodiment 96, 98, or 99 wherein the radiation or excitation light has a power density less than 100 $W/cm^2$ at the one or more selected locations.

Embodiment 107 is the method of embodiment 96, 98, or 99 wherein the radiation or excitation light has a power density less than 10 $W/cm^2$ at the one or more selected locations.

Embodiment 108 is the method of embodiment 96, 98, or 99 wherein the article is suspended in the volume during formation.

Embodiment 109 is a method for spatially limiting photohardening of a photohardenable composition during formation of an article. The method comprises: (a) providing a volume of the photohardenable composition of any one of embodiments 1-36; (b) irradiating one or more selected locations in the photohardenable composition with radiation including one or more wavelengths for activating the photoinitiator to initiate hardening of the photohardenable composition at the one or more selected locations within the photohardenable composition; and (c) optionally repeating step (b) at one or more of the same or different selected locations within the photohardenable composition until at least a portion of the article is formed.

Embodiment 110 is the method of embodiment 109 wherein the stabilizer comprising the stable free radical-functionalized polymer reacts with radicals generated by an activated photoinitiator and spatially limits cure.

Embodiment 111 is a further method for spatially limiting photohardening of a photohardenable composition during formation of an article. This method comprises: (a) providing a volume of the photohardenable composition of any one of embodiments 37-95; (b) irradiating one or more selected locations in the photohardenable composition with excitation light at one or more wavelengths in the first range of wavelengths for upconversion by the upconverting component and initiating local hardening of the photohardenable composition at the one or more selected locations in the photohardenable composition; and (c) optionally repeating step (b) at the same or a different selected location within the volume of the photohardenable composition until at least a portion of the article is formed.

Embodiment 112 is the method of embodiment 111 wherein the radiation upconversion has a quadratic intensity dependence, so that local hardening of the photohardenable composition is initiated preferentially at more intensely illuminated locations within the volume of the photohardenable composition.

Embodiment 113 is the method of embodiment 109 or 111 wherein the volume of the photohardenable composition is included within a container wherein at least a portion of the container is optically transparent so that the photohardenable composition is accessible by excitation light.

Embodiment 114 is the method of embodiment 111 wherein the excitation light has an excitation intensity so that local hardening of the photohardenable composition by the upconverted light is initiated at the one or more selected locations within the volume of the photohardenable composition.

Embodiment 115 is the method of embodiment 111 wherein the stabilizer comprising the stable free radical-functionalized polymer reacts with radicals generated by an activated photoinitiator and spatially limits cure.

Embodiment 116 is the method of embodiment 109 or 111 wherein the method is carried out under inert conditions and the photohardenable composition is treated to remove oxygen beforehand.

Embodiment 117 is a stabilizer for inclusion in a photohardenable composition for three-dimensional printing wherein the composition comprises a hardenable resin component and a photoinitiator, the stabilizer comprising a stable free radical functionalized polymer, wherein the stabilizer is dispersible or dissolvable in the hardenable resin component.

Embodiment 118 is the stabilizer of embodiment 117 wherein the stable free radical-functionalized polymer comprises one or more stable free radicals.

Embodiment 119 is the stabilizer of embodiment 117 wherein the stable free radical functionalized polymer comprises a polymer chemically modified with one or more stable free radicals.

Embodiment 120 is the stabilizer of embodiment 117 wherein a stable free radical moiety comprises a nitroxide free radical.

Embodiment 121 is the stabilizer of embodiment 117 wherein a stable free moiety comprises 2,2,6,6-tetramethyl-1-piperidinyloxy or a derivative thereof.

Embodiment 122 is the stabilizer of embodiment 117 wherein a stable free radical moiety comprises 2,2,5,5-tetramethyl-1-pyrrolidinyloxy or a derivative thereof.

Embodiment 123 is the stabilizer of embodiment 117 wherein a stable free radical moiety comprises 4,4-dimethyl-3-oxazolidinyloxy or a derivative thereof.

Embodiment 124 is the stabilizer of embodiment 117 wherein a stable free radical moiety comprises tris(4-bromophenyl)ammoniumyl hexachloroantimonate.

Embodiment 125 is the stabilizer of embodiment 117 wherein the stable free radical-functionalized polymer comprises one or more types of monomer units in any sequence.

Embodiment 126 is the stabilizer of embodiment 117 wherein the stable free radical-functionalized polymer comprises homopolymer.

Embodiment 127 is the stabilizer of embodiment 117 wherein the stable free radical-functionalized polymer comprises a random copolymer.

Embodiment 128 is the stabilizer of embodiment 117 wherein the stable free radical-functionalized polymer comprises an alternating copolymer.

Embodiment 129 is the stabilizer of embodiment 117 wherein the stable free radical-functionalized polymer comprises a gradient copolymer.

Embodiment 130 is the stabilizer of embodiment 117 wherein the stable free radical-functionalized polymer comprises a block copolymer.

Embodiment 131 is the stabilizer of embodiment 117 wherein the stable free radical-functionalized polymer comprises a combination including one or more polymers or copolymers.

Embodiment 132 is the stabilizer of embodiment 117 comprising TEMPO-functionalized polyetheramine.

Embodiment 133 is the stabilizer of embodiment 117 wherein the stable free radical-functionalized polymer comprises a polymer with a molecular weight of 200 g/mol or higher.

Embodiment 134 is the stabilizer of embodiment 117 wherein the stable free radical-functionalized polymer has a lower molecular diffusivity in the photohardenable composition than a molecule of the same stable free radical not attached to a polymer.

Embodiment 135 is the stabilizer of embodiment 117 wherein the stabilizer provides inhibitory activity in the photohardenable composition without the presence of oxygen.

Embodiment 136 is an article comprising a three-dimensional object prepared by the method of embodiment 96.

Embodiment 137 is an article comprising a two-dimensional pattern prepared by the method of embodiment 96.

Embodiment 138 is an article comprising a three-dimensional object prepared by the method of embodiment 98.

Embodiment 139 is an article comprising a two-dimensional pattern prepared by the method of embodiment 98.

Embodiment 140 is the method of embodiment 109 or 111 wherein the stabilizer comprising the stable free radical-functionalized polymer reacts with a portion of at least one of (1) reactive species generated by an activated photoinitiator and (2) propagating radical chain generated during photohardening to spatially limit polymerization outside the selected locations.

Embodiment 141 is an article comprising a three-dimensional object prepared by a method including the method of embodiment 109.

Embodiment 142 is an article comprising a three-dimensional object prepared by a method including the method of embodiment 111.

Embodiment 143 is the photohardenable composition of embodiment 1 or 37 wherein the stabilizer comprises TEMPO-functionalized polyetheramine.

Embodiment 144 is the stabilizer of embodiment 117 wherein the stabilizer is prepared by functionalizing an amine-terminated polyalkylene ether with a stable free radical moiety.

Embodiment 145 is the photohardenable composition of embodiment 1 or 37 wherein the stabilizer is prepared by functionalizing an amine-terminated polyalkylene ether with a stable free radical moiety.

Embodiment 146 is the method of any one of embodiments 96, 98, 99, 109 and 111 wherein the stabilizer is prepared by functionalizing an amine-terminated polyalkylene ether with a stable free radical moiety.

EXAMPLES

The examples provided herein are provided as examples and not limitations, wherein a number of modifications of the exemplified compositions and processes are contemplated and within the scope of the present invention.

Example 1

Preparation of a Stabilizer Comprising 4-Carboxy-2,2,6,6-Tetramethylpiperidine-1-Oxyl-Functionalized Polyetheramine 100 mg 4-carboxy-2,2,6,6-tetramethylpiperidine-1-oxyl (97%, Sigma Aldrich) is weighed out and added to a 20 mL amber scintillation vial. 0.72 g poly(propylene glycol) bis (2-aminopropyl ether) (average Mn ~2000 g/mol, Sigma Aldrich) is added to the vial by pipet. 5 mL (6.2 g) dimethyl sulfoxide (anhydrous, >99.9%, Sigma Aldrich) is added by syringe. The vial is mixed in a speedmixer (model DAC 150.1 FVZ-K, Flacktek) at 3100 rpm for 1 min. 250 μl triethylamine (puriss. p.a., >99.5% (GC), Sigma Aldrich) is added, and the vial is sealed and then shaken to mix. 680 mg N,N,N',N'-tetramethyl-hexafluorophosphate (>98.0%, Sigma Aldrich) is weighed out and added to the vial. The vial is purged with nitrogen gas for 15 min, covered with foil, and placed on a stir plate to stir for 3 days at room temperature. The contents of the vial are poured into a 60 mL separatory funnel. 16 mL ethyl acetate (ACS reagent, >99.5%, Sigma Aldrich) is added to the funnel. The funnel is shaken to mix. A homogeneous copper-colored solution is obtained. The solution is washed with 16 mL distilled water followed by 3×16 mL sodium chloride solution (technical, –26% (saturated in water at 20° C., AT), Sigma Aldrich). The aqueous fraction is discarded after each wash. The organic solution is poured into a 250 mL round bottom flask along with a small amount of acetone (ACS, VWR) used to rinse the funnel. The organic solvent is removed by rotary evaporation, leaving a copper-colored transparent oil as the crude product. The crude product is purified by column chromatography before further use.

Following is the chemical structure of 4-Carboxy-2,2,6,6-Tetramethylpiperidine-1-Oxyl-Functionalized Polyetheramine:

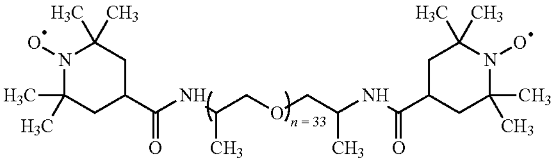

Example 2

Preparation of Nanocapsules Including a Micelle Core Including a Sensitizer, an Annihilator, and Oleic Acid Surrounded by a Silica Shell with a Functionalized Surface Distilled water is titrated to pH 10.5 with sodium hydroxide (200 mL), chilled over an ice bath, and then poured into to a Vitamin Blender (Amazon.com) in an inert atmosphere, An amount of a stock solution containing sensitizer and annihilator (e.g 1.45 mL) is carefully dispensed into the water in one portion (stock solution: PdTBTP (0.5 mg/mL) and Br-TIPS anthracene (10 g/mL) in 99% oleic acid)). The solution is blended (for example, for 60 seconds at the maximum speed of the Blender), and the resulting emulsion is transferred to a flask and immediately stirred at high speed. A silane coupling agent (e.g., (3-aminopropyl)triethoxysilane (0.75 mL, Acros Organics)) is added until the mixture becomes transparent, and then a surfactant (e.g., 5K MPEG-Silane (4 g, Nanosoft Polymers)) is immediately added to prevent capsule aggregation. After 10 minutes, a process is initiated form forming a shell over the micelle cores, including adding tetraethyl orthosilicate (TEOS, 36 mL, Sigma Aldrich) in one portion. The flask is sealed with a septum and the solution is stirred vigorously for 30 minutes at room temperature. Then, the flask is heated to 65° C. at constant pressure for 2 days. The reaction crude is allowed to cool to room temperature, poured into a centrifuge tube, and centrifuged at 7000 rpm for one hour at room temperature (18-22° C.), after which the pellet is discarded. The solution is then centrifuged at 7000 rpm for 14 hours at room temperature. After the second centrifuge, the Upconverting Nanocapsule (UCNC) paste is transferred from the glovebox to a round bottom flask where 100 mL of ethanol and 10 mL of water, as well as 2 mL of 30% $NH_3OH$ and is stirred until a homogeneous solution is formed. To this solution is added at 60 degrees Celsius 6 mL of 3-(Trimethoxysityl)propyl methacrylate. The solution is stirred 24 hours at 60 degrees Celsius, then centrifuged at 6000 RPM for 8 hours to obtain the solid capsule paste, discarding the ethanol. This paste is redispersed in 200 mL of benzyl acrylate (Komerate A003, Green Chemical Co.) and stirred 4 hours at 60 degrees Celsius to remove any external sensitizer that might remain, and centrifuged one more time at 6000 RPM for 8 hours to obtain the capsule paste.

Example 3

Preparation of a Nanocapsule Dispersion for Inclusion in a Photohardenable Composition To make a dispersion of nanocapsules suitable for mixing into resin, a quantity of capsule slurry (typically 2 g to 100 g) obtained from centrifugation (see, e.g., Example 2 above) is transferred to a suitable plastic jar. The jar is mixed in a speedmixer (model DAC 150.1 FVZ-K, Flacktek) to mix the capsules and distribute the capsules evenly in the bottom of the jar. A small quantity (about 0.1-1 g) of mixed capsule slurry is placed in a disposable aluminum pan. The masses of the sample and pan are recorded. The mass of the remaining capsule slurry in the jar is recorded. The pan is placed in a vacuum oven set 130° C. to dry under vacuum for at least 2 hr. The pan is removed from the oven and the combined mass of dried samples and pan is recorded. The solids fraction of the capsule slurry is calculated as the dried capsules mass (difference in final and empty pan masses) divided by the initial sample mass times 100%. A typical range of solids fraction in the capsule slurry is about 35 wt % to about 70 wt %. A quantity of benzyl acrylate (Komerate A003, Green Chemical Co.) is added to the jar containing the remaining capsule slurry to adjust the solids content to 35 wt %. The jar is speedmixed until a homogeneous dispersion is obtained. Mixing time and speed is adjusted based on the consistency of the material. Typical mixing speeds and times are 3500 rpm and 3 min. The mixing may be conducted multiple times at the same or different speeds and times. If any nondispersible material remains, the dispersion is poured or pressed through a disposable paint strainer (190 μm mesh) into a new jar for storage.

Example 4

Preparation of a Photohardenable Composition Including a Stable Free Radical Functionalized Polymer Stabilizer, an Upconverting Component, and One or More Optional Additives 45 mg 3,3'-carbonylbis(7-(dihexylamino)chromen-2-one) (purified by column chromatography) is weighed out and added to a 40-mL amber septum-top scintillation vial. 30 mg butyrylcholine triphenylbutylborate (Borate V, Spectra Group Limited, Inc.) is weighed out and added to the vial. 300 mg bis(4-tert-butylphenyl)iodonium hexafluorophosphate (Speedcure 938, Lambson) is weighed out and added to the vial. 0.75 g 0.6 wt % Sudan I dye (technical grade, Sigma Aldrich) solution in N,N-dimethylacrylamide (99.5%, Sigma Aldrich) is added to the vial by disposable plastic pipet, and the vial is placed in a heating block at 65° C. for 5 min. The vial is vortexed for 20 s to complete dissolution of the powders. 6.0 g nanocapsule dispersion (35.0 wt % capsules dry weight in benzyl acrylate; see Example 3, above) is added to the vial by disposable plastic pipet. The vial is mixed in a speedmixer (model DAC 150.1 FVZ-K, Flacktek) for 1 min at 3100 rpm. 10.5 g difunctional aliphatic urethane acrylate (Genomer 4259, Rahn A G) is added to the vial by large bore plastic syringe. The vial is speedmixed for 1 min at 3100 rpm. 3.0 g dipentaerythritol pentaacrylate (SR 399, Sartomer) is added to the vial by large bore plastic syringe. 15 μL defoamer (BYK 1798) is added to the vial by capillary piston pipette. The vial is speedmixed for 1 min at 3100 rpm. 0.45 g thixotrope (Rheobyk 410, BYK) is added to the vial by disposable plastic pipet. The vial is speedmixed for 1 min at 2100 rpm. The vial is transferred to the glovebox, and 90 μL 1.0 w/v % 4-carboxy-2,2,6,6-tetramethylpiperidine-1-oxyl-functionalized polyetheramine (see Example 1 above) solution in N,N-dimethylacrylamide is added by micropipette. The vial is resealed, placed in a heating block at 45° C., and then sparged with pure nitrogen for 15 min.

Example 5

An article (e.g., a 3-dimensional object) is formed from a photohardenable composition in accordance with the present invention by a method that includes irradiating or directing excitation light generated by a light source or optical projection system into the photohardenable composition. Preferably the excitation light is selected based on the photohardenable composition. For example, if the photohardenable composition does not include an upconverting component, a light source that emits light at one or more wavelengths or one or more wavelength ranges absorbed by the photoinitiator included in the photohardenable composition is preferred; if the photohardenable composition includes an upconverting component, a light source that emits light in a wavelength range absorbed by the upconverting component is preferred. The excitation light generated is irradiated or directed to one or more selected locations in the photohardenable composition to initiate polymerization of the photohardenable composition at the one or more locations. Optionally the irradiating or directing step is repeated at one or more times at one or more of the same or different selected locations within the photohardenable composition until at least a portion of the article, or the whole article, is formed. Movement of light in the photohardenable composition can be achieved, for example, by moving the light source or optical system relative to the position of the photohardenable composition, or by moving the photohardenable composition (e.g., contained within a container or build region) relative to the light source. A three-axis translation stage can be useful when changing the position of the photohardenable composition relative to the light source to facilitate irradiating the photohardenable composition at the one or more selected locations therein.

Other information that may be useful in connection with the compositions and methods of the present invention includes WO 2020/113018 A1 of the President And Fellows Of Harvard College, published Jun. 4, 2020; U.S. Patent Application No. 62/911,125 of Congreve, et al., filed Oct. 4, 2019; WO 2020/257231 A1 of the President And Fellows Of Harvard College, published Dec. 24, 2020; U.S. Patent Application No. 62/911,128 of Congreve, et al., filed Oct. 4, 2019; U.S. Application No. 63/013,679 of Congreve, et al., filed Apr. 22, 2020; International Application No. PCT/US2020 of the President And Fellows Of Harvard College, filed Oct. 1, 2020; U.S. Patent Application No. 62/966,945 of Kazlas, filed Jan. 28, 2020; U.S. Patent Application No. 63/003,051 of Kazlas, filed Mar. 31, 2020; U.S. Patent Application No. 63/003,078 of Eric M. Arndt filed Mar. 31, 2020; U.S. Patent Application No. 63/034,164 of Peter T. Kazlas, et al., filed Jun. 3, 2020; and U.S. Patent Application No. 63/034,184 of Karen Twietmeyer, et al., filed Jun. 3, 2020; U.S. Application No. 63/091,863 of Arndt, et al., filed Oct. 14, 2020; U.S. Application No. 63/121,906 of Arndt, et al., filed Dec. 5, 2020; and PCT/US2021/015343 of Quadratic 3D, Inc., filed Jan. 27, 2021. Each of the foregoing is hereby incorporated herein by reference in its entirety.

As used herein, the singular forms "a", "an" and "the" include plural unless the context clearly dictates otherwise. Thus, for example, reference to an emissive material includes reference to one or more of such materials.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A photohardenable composition for use in three-dimensional printing an object in a volume of the photohardenable composition, the composition comprising:

(i) a hardenable resin component;

(ii) a photoinitiator configured to create reactive species for initiating hardening of the photohardenable composition by free radical reactions when activated by radiation; and (iii) a stabilizer comprising a stable free radical-functionalized polymer, wherein the stable free radical-functionalized polymer comprises a polymer functionalized with one or more stable free radicals.

2. The photohardenable composition of claim 1 wherein at least one of the one or more stable free radicals comprises a nitroxide free radical.

3. The photohardenable composition of claim 1 wherein at least one of the one or more stable free radicals comprises a 2,2,6,6-tetramethyl-1-piperidinyloxy free radical or a derivative thereof.

4. The photohardenable composition of claim 1 wherein at least one of the one or more stable free radicals comprises a 2,2,5,5-tetramethyl-1-pyrrolidinyloxy free radical or a derivative thereof.

5. The photohardenable composition of claim 1 wherein at least one of the one or more stable free radicals comprises a 4,4-dimethyl-3-oxazolidinyloxy free radical or a derivative thereof.

6. The photohardenable composition of claim 1 wherein at least one of the one or more stable free radicals comprises a tris(4-bromophenyl) ammoniumyl hexachloroantimonate free radical.

7. The photohardenable composition of claim 1 wherein the polymer that is functionalized with one or more stable free radicals includes one or more types of monomer units in any sequence.

8. The photohardenable composition of claim 1 wherein the polymer that is functionalized with one or more stable free radicals comprises a combination including one or more polymers or copolymers.

9. The photohardenable composition of claim 1 wherein the stable free radical-functionalized polymer has a lower molecular diffusivity in the photohardenable composition than of the same one or more stable free radicals when not attached to the polymer.

10. The photohardenable composition of claim 1 wherein the hardenable resin component comprises a free radical polymerizable or free-radical-cross-linkable component and the photoinitiator initiates polymerization or cross-linking of the hardenable resin component by free radical reactions.

11. A stabilizer for inclusion in a photohardenable composition for three-dimensional printing an object in a volume of the photohardenable composition wherein the photohardenable composition comprises a hardenable resin component and a photoinitiator, the stabilizer comprising a stable free radical functionalized polymer, wherein the stable free radical-functionalized polymer comprises a polymer functionalized with at least one stable free radical, and wherein the stabilizer is dispersible or dissolvable in the hardenable resin component.

12. The stabilizer of claim 11 wherein the polymer is chemically modified with one or more stable free radicals.

13. The stabilizer of claim 11 wherein the at least one stable free radical comprises a nitroxide free radical.

14. The stabilizer of claim 11 wherein the at least one stable free radical comprises a 2,2,6,6-tetramethyl-1-piperidinyloxy free radical or a derivative thereof.

15. The stabilizer of claim 11 wherein the at least one stable free radical comprises a 2,2,5,5-tetramethyl-1-pyrrolidinyloxy free radical or a derivative thereof.

16. The stabilizer of claim 11 wherein the at least one stable free radical comprises a 4,4-dimethyl-3-oxazolidinyloxy free radical or a derivative thereof.

17. The stabilizer of claim 11 wherein the at least one stable free radical comprises a tris(4-bromophenyl) ammoniumyl hexachloroantimonate free radical.

18. The stabilizer of claim 11 wherein the polymer comprises one or more types of monomer units in any sequence.

19. The stabilizer of claim 11 wherein the polymer comprises a combination including one or more polymers or copolymers.

20. The stabilizer of claim 11 wherein the stable free radical-functionalized polymer has a lower molecular diffusivity in the photohardenable composition than the same one or more stable free radicals when not attached to the polymer.

21. The stabilizer of claim 11 wherein the stabilizer provides inhibitory activity in the photohardenable composition without a presence of oxygen.

* * * * *